(12) United States Patent
Amendt et al.

(10) Patent No.: US 11,378,435 B2
(45) Date of Patent: Jul. 5, 2022

(54) DEVICE AND METHOD FOR EVALUATING AMOUNT OF BIOLOGICAL SAMPLE IN A SPECIMEN CONTAINER

(71) Applicant: Quest Diagnostics Investments Incorporated, San Clemente, CA (US)

(72) Inventors: Christine Amendt, Camarillo, CA (US); Sevag Bedrosian, Granada Hills, CA (US); Gordon Love, Thousand Oaks, CA (US); Mkrtich Daniyelyan, Panorama City, CA (US); Miguel Torrero, North Hollywood, CA (US)

(73) Assignee: Quest Diagnostics Investments Incorporated, Wilmington, DE (US)

( * ) Notice: Subject to any disclaimer, the term of this patent is extended or adjusted under 35 U.S.C. 154(b) by 230 days.

(21) Appl. No.: 15/511,982

(22) PCT Filed: Sep. 16, 2015

(86) PCT No.: PCT/US2015/050430
§ 371 (c)(1),
(2) Date: Mar. 16, 2017

(87) PCT Pub. No.: WO2016/044427
PCT Pub. Date: Mar. 24, 2016

(65) Prior Publication Data
US 2017/0292868 A1 Oct. 12, 2017

Related U.S. Application Data

(60) Provisional application No. 62/051,829, filed on Sep. 17, 2014.

(51) Int. Cl.
*G01F 23/02* (2006.01)
*G01F 11/26* (2006.01)
(Continued)

(52) U.S. Cl.
CPC ............... *G01F 23/02* (2013.01); *B01L 3/00* (2013.01); *G01F 11/262* (2013.01); *G01N 30/00* (2013.01)

(58) Field of Classification Search
CPC .......... G01F 23/02; G01F 11/262; B01L 9/06; B01L 3/5082; B25H 3/003; B04B 5/0421
(Continued)

(56) References Cited

U.S. PATENT DOCUMENTS 2,741,913 A * 4/1956 Dovas .................... B25H 3/003
73/61.65
2,801,541 A * 8/1957 Moreland ............... G01F 23/66
73/319

(Continued)

FOREIGN PATENT DOCUMENTS

CN 202315977 U * 7/2012
CN 103252266 A 8/2013
(Continued)

OTHER PUBLICATIONS

Translate JP-5662569-B2 (Year: 2015).*
(Continued)

*Primary Examiner* — Alexander A Mercado
*Assistant Examiner* — Monica S Young
(74) *Attorney, Agent, or Firm* — Foley & Lardner LLP

(57) ABSTRACT

An apparatus and method are provided to evaluate an amount of a biological sample in a specimen container. A fixture has a bottom surface configured to support a specimen container. A reference indicator is disposed at a predetermined height relative to the bottom surface. The reference indicator is configured to facilitate a visual comparison of the reference indicator with a height of a volume of a biological sample in the specimen container.

16 Claims, 22 Drawing Sheets

(51) Int. Cl.
*G01N 30/00* (2006.01)
*B01L 3/00* (2006.01)

(58) Field of Classification Search
USPC .......................................................... 73/323
See application file for complete search history.

(56) References Cited

U.S. PATENT DOCUMENTS

| | | | | |
|---|---|---|---|---|
| 3,933,439 | A * | 1/1976 | McDonald | A61B 5/15003 |
| | | | | 600/575 |
| 4,079,859 | A | 3/1978 | Jennings | |
| 4,182,161 | A * | 1/1980 | Greenfield | G01N 15/04 |
| | | | | 346/33 ME |
| 4,344,113 | A | 8/1982 | Ditto et al. | |
| 4,388,839 | A * | 6/1983 | Benisti | A47J 43/27 |
| | | | | 73/428 |
| 4,392,497 | A * | 7/1983 | Ghaussy | G01N 15/05 |
| | | | | 600/370 |
| 4,415,011 | A | 11/1983 | Grant | |
| 4,454,759 | A | 6/1984 | Pirkle | |
| 4,663,960 | A * | 5/1987 | Makkink | G01F 25/0092 |
| | | | | 73/1.36 |
| 4,801,428 | A * | 1/1989 | Homolko | G01N 15/05 |
| | | | | 422/430 |
| 4,827,944 | A * | 5/1989 | Nugent | G01N 33/521 |
| | | | | 600/584 |
| 4,902,137 | A | 2/1990 | Krieg et al. | |
| 5,349,875 | A * | 9/1994 | Sher | G01N 1/08 |
| | | | | 73/864.65 |
| 5,375,742 | A * | 12/1994 | Mowry | B01F 13/002 |
| | | | | 222/131 |
| 5,731,513 | A * | 3/1998 | Bull | G01N 15/05 |
| | | | | 210/513 |
| 5,985,215 | A * | 11/1999 | Sakazume | G01N 35/026 |
| | | | | 422/105 |
| 6,354,452 | B1 * | 3/2002 | DeSalvo | B01L 3/5082 |
| | | | | 215/12.1 |
| 6,355,488 | B1 * | 3/2002 | Rousseau | G01N 35/026 |
| | | | | 422/65 |
| 6,494,089 | B1 * | 12/2002 | Geschwender | G01F 23/02 |
| | | | | 73/170.21 |
| 7,263,893 | B2 | 9/2007 | Kosmyna et al. | |
| 7,469,584 | B1 * | 12/2008 | Subnick | G01F 19/00 |
| | | | | 73/290 R |
| 8,859,289 | B2 * | 10/2014 | Marty | G01N 35/04 |
| | | | | 436/48 |
| 2006/0180075 | A1 * | 8/2006 | Kosmyna | B01F 13/002 |
| | | | | 116/227 |
| 2007/0116600 | A1 * | 5/2007 | Kochar | G01N 21/76 |
| | | | | 422/65 |
| 2007/0246116 | A1 | 10/2007 | Peak et al. | |
| 2008/0125673 | A1 * | 5/2008 | Carano | A61B 5/1405 |
| | | | | 600/584 |
| 2009/0148869 | A1 * | 6/2009 | Zaugg | G01N 33/491 |
| | | | | 435/7.24 |
| 2010/0043532 | A1 * | 2/2010 | Muralidharan | G01N 15/0826 |
| | | | | 73/38 |
| 2011/0039709 | A1 | 2/2011 | Lips et al. | |
| 2011/0178424 | A1 * | 7/2011 | Wilkinson | A61B 10/0096 |
| | | | | 600/573 |
| 2012/0210778 | A1 * | 8/2012 | Palmer | B01L 3/5453 |
| | | | | 73/149 |
| 2013/0213911 | A1 | 8/2013 | Theisen et al. | |
| 2014/0080149 | A1 * | 3/2014 | Goehde | G01N 33/56972 |
| | | | | 435/7.24 |
| 2017/0341079 | A1 * | 11/2017 | King | B04B 15/00 |
| 2020/0072857 | A1 * | 3/2020 | Oda | G01N 35/026 |

FOREIGN PATENT DOCUMENTS

| | | | | |
|---|---|---|---|---|
| EP | 2 110 174 A1 | 10/2009 | | |
| JP | H-0515954 | * | 7/1993 | |
| JP | 5662569 B2 | * | 2/2015 | ....... G06F 16/24578 |

OTHER PUBLICATIONS

Translate CN-202315977-U (Year: 2012).*
Translate JPH-0515954 (Year: 1993).*
Extended European Search Report dated Mar. 12, 2018 in corresponding European application No. 15 84 2147.9, 8 pages.
International Preliminary Report on Patentability dated Mar. 30, 2017, in corresponding International Application No. PCT/US2015/050430, 7 pages.
International Search Report dated Dec. 14, 2015, in corresponding International Application No. PCT/US2015/050430, 2 pages.
Written Opinion of the International Searching Authority dated Dec. 14, 2015, in corresponding International Application No. PCT/US2015/050430, 5 pages.
Examination Report dated Nov. 4, 2019 received in corresponding European application No. 15 842 147.9, 7 pages.
"S-Sedivette Enclosed ESR System—Sarstedt—PDF Catalogue, Technical Documentation," Jul. 5, 2013, retrieved from https://web.archive.org/web/20130705030601/https://pdf.medicalexpo.com/pdf/sarstedt/s-sedivette-enclosed-esr-system/69921-70428.html.
Office Action dated Sep. 20, 2021 in EP 15842147.9.

* cited by examiner

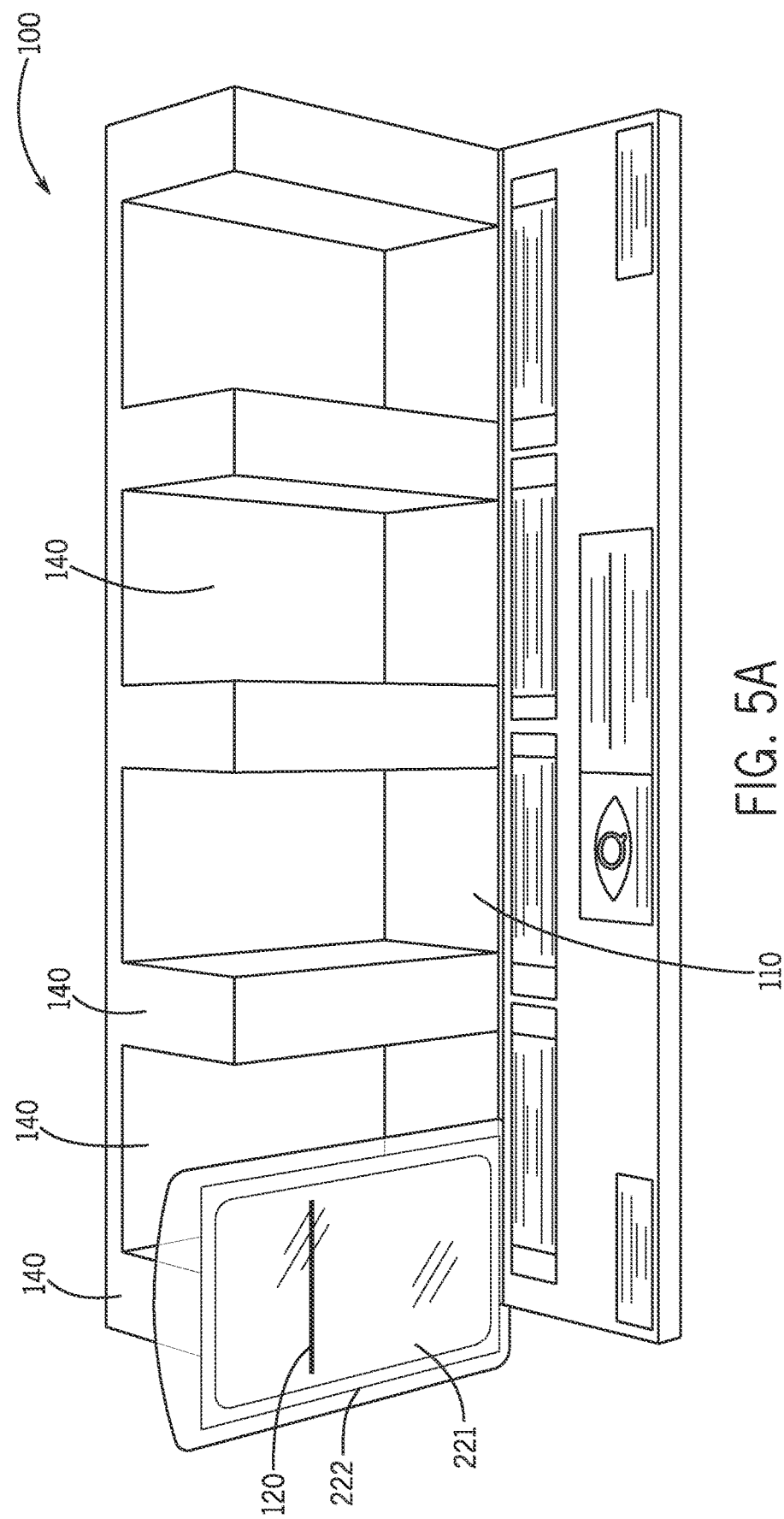

DEVICE AND METHOD FOR EVALUATING AMOUNT OF BIOLOGICAL SAMPLE IN A SPECIMEN CONTAINER

CROSS-REFERENCE TO RELATED PATENT APPLICATIONS

The present application is a U.S. National Stage of International Application No. PCT/US2015/050430 filed on Sep. 16, 2015, which claims the benefit of U.S. Provisional Patent Application No. 62/051,829 filed on Sep. 17, 2014, the entire disclosures of all of which are incorporated herein by reference.

BACKGROUND

In many laboratory applications, it is desirable to assess the amount of a biological sample in a specimen container. For example, it may be necessary to determine whether the amount of a biological sample is within a range necessary for a desired laboratory test. Alternatively, it may be necessary to determine whether the amount of biological sample suggests that a specimen container has been previously subjected to laboratory testing. In some cases, an evaluation of the volume of a biological sample is the only way to determine whether a biological sample has previously been subjected to testing that may have contaminated the biological sample.

It is desirable to assess at high speed and low cost the amount of a biological sample in a specimen container, without opening the specimen container or removing the biological sample from the specimen container. Additionally, under certain circumstances it may be desirable to qualitatively assess the amount of the biological sample in the specimen container without quantitatively measuring the volume of the biological sample.

Pre-existing evaluation processes include the comparison of a biological sample in a specimen container to volume indicators on a label of a specimen container. However, the labels of specimen containers may be applied inconsistently or may be damaged, rendering a volume of a biological sample determined therefrom inaccurate. Other pre-existing evaluation processes utilize optical sensors and computerized analysis systems, which are complicated and expensive.

SUMMARY

Various embodiments relate to the evaluation of an amount of a biological sample in a specimen container without removing the biological specimen from the specimen container, and apparatuses adapted for that purpose.

An apparatus for evaluating an amount of biological sample in a specimen container is provided. The apparatus may include a fixture with a bottom surface configured to support a specimen container, and a reference indicator disposed at a predetermined height relative to the bottom surface. The reference indicator may be configured to facilitate a visual comparison of the reference indicator with a height of a volume of a biological sample in the specimen container.

A method of evaluating an amount of biological sample in a specimen container is provided. The method may include disposing a specimen container in a fixture having a bottom surface configured to support the specimen container, and visually comparing a height of a volume of a biological sample in the specimen container with a reference indicator to determine if the specimen container contains an acceptable volume of biological sample. The reference indicator may be disposed at a predetermined height relative to the bottom surface.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIGS. 5A-5C are perspective views of another embodiment of an apparatus for evaluating an amount of biological sample in a specimen container, which includes a holder and a removable member in various positions.

DETAILED DESCRIPTION

Figure 1:
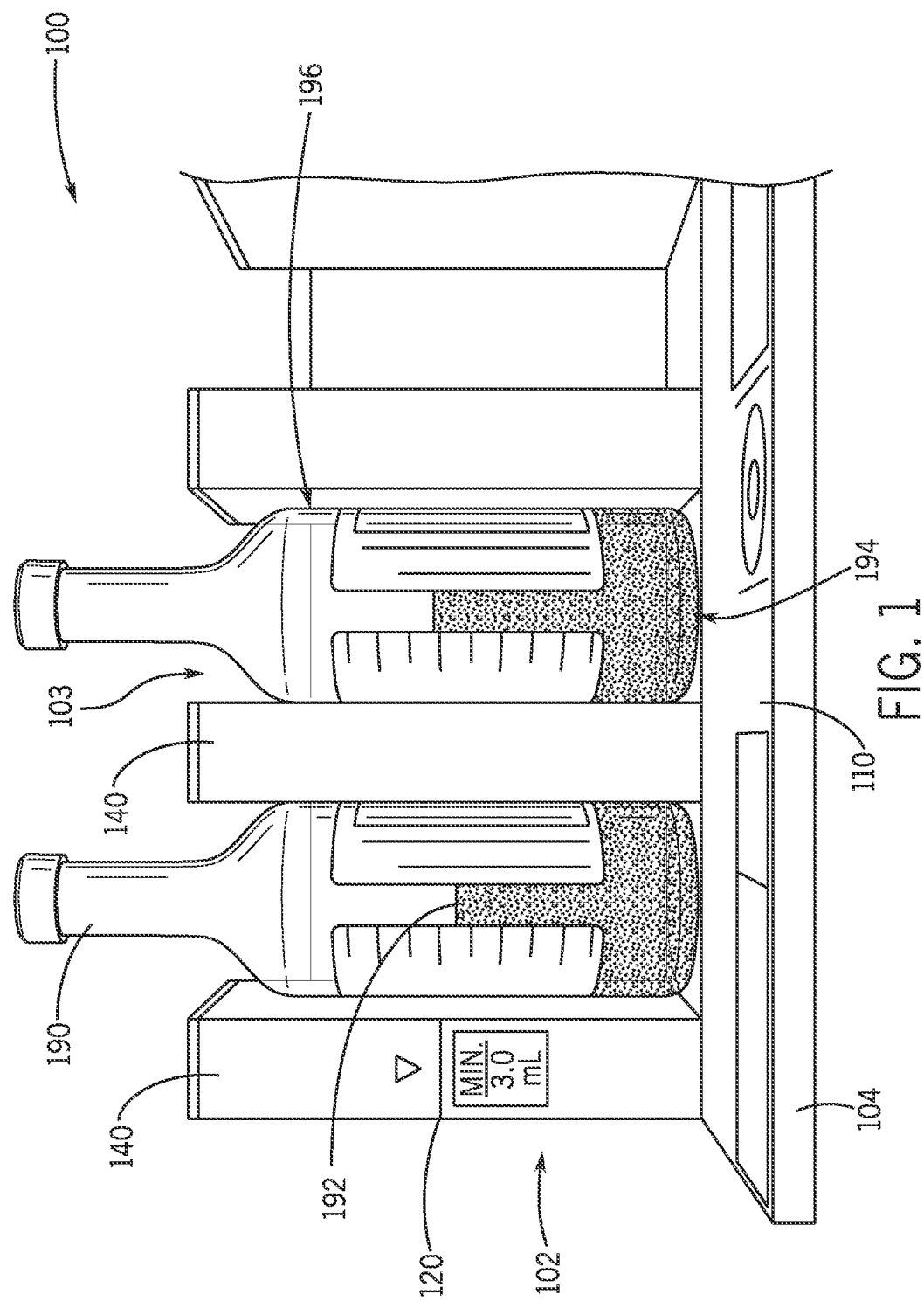
FIG. 1 is a front view of an embodiment of an apparatus for evaluating an amount of biological sample in a specimen container.

Various exemplary embodiments relate to an apparatus for evaluating an amount of biological sample in a specimen container, and a method of evaluating an amount of biological sample in a specimen container. The apparatus and method may allow for a visual comparison of the amount of biological sample in a specimen container with a reference indicator to evaluate whether the specimen container contains an acceptable volume of the biological sample. The evaluation may be conducted without opening the specimen container and without quantitatively determining the amount of biological sample in the specimen container.

The apparatus and method may be utilized to evaluate whether the amount of biological sample in a specimen container is acceptable for a desired laboratory test. The evaluation process may include disposing a specimen container on a bottom surface of an apparatus. The apparatus can have a reference indicator located at a predetermined height above the bottom surface. The height of the volume of the biological sample in the specimen container may then be visually compared with the reference indicator to determine if the specimen container contains an acceptable or desirable volume of the biological sample. The evaluation process may additionally include placing a vertical surface of the specimen container in contact with a support of the apparatus. The bottom surface of the apparatus may be leveled, ensuring an accurate comparison of the height of the biological sample in the specimen container with the reference indicator. The specimen container may be illuminated with a light source, such as a light source included in the apparatus. According to one embodiment, the evaluation process may include disposing a removable member containing the reference indicator in a holder of the apparatus. The evaluation process may additionally include relatively positioning the reference indicator and an eye level of a user such that the reference indicator and the eye level of the user are located at substantially the same height.

The apparatus may be formed from any appropriate material and by any appropriate method. According to one embodiment, the apparatus may include a fixture made of wood, metal, or a polymer. The material forming at least a portion of the apparatus may be a transparent material, such that light may pass through the material and illuminate a specimen container. The apparatus may be produced from a single piece of material or by connecting individual components, for example by the use of mechanical fasteners, adhesive bonding, or welding. Alternatively, the apparatus may be formed by a 3-D printing process.

The reference indicator may be any appropriate indicator. According to one embodiment, the reference indicator may be a line or an arrow. According to an alternative embodiment, the reference indicator may be a top surface of the apparatus. The apparatus may include more than one reference indicator. In one embodiment the multiple reference indicators can indicate a minimum and a maximum acceptable biological sample volume. According to another embodiment, the multiple reference indicators may be configured such that the area above a first reference indicator indicates a suitable biological sample volume for a first condition, such as a first test, and the area between the first reference indicator and the second reference indicator indicates a suitable biological sample volume for a second condition, such as a second test.

The apparatus may be configured to be utilized with any appropriate specimen container. According to one embodiment, the specimen container may be a bottle, cup, vial, or test tube. The specimen container may have a flat or curved bottom surface, and the bottom surface of the apparatus may have a shape matching the shape of the bottom surface of the specimen container.

Various embodiments of the apparatus are described below, showing specific examples of implementations of one or more of the above-described features. It is to be understood that the features can be included or omitted in any variety of permutations, and are not limited to just the specific embodiments described below.

Figure 2:
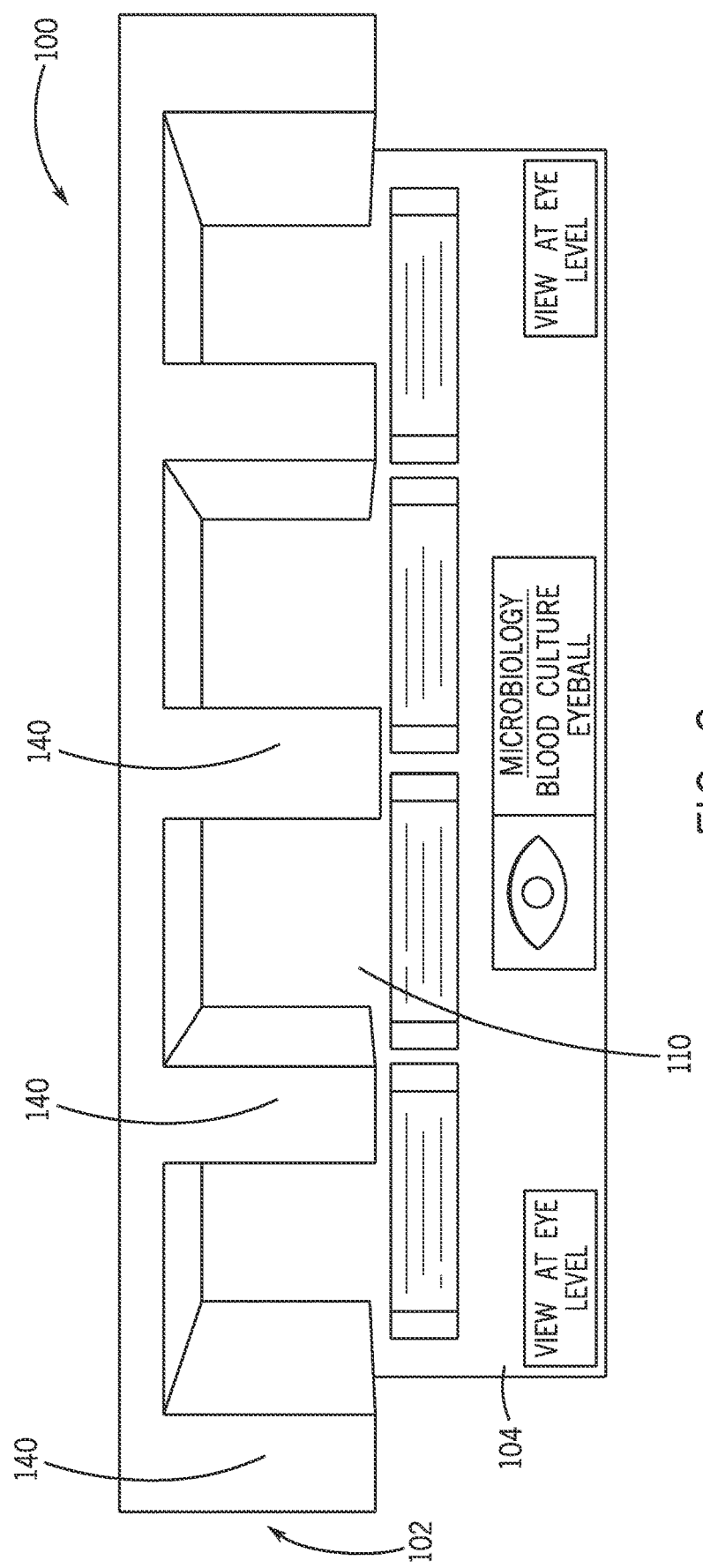
FIG. 2 is a top view of the apparatus of FIG. 1.

As shown in FIGS. 1 and 2, an embodiment of the apparatus 100 may include a fixture 102 having a base 104 with a bottom surface 110 configured to support a specimen container 190. The specimen container 190 shown in FIG. 1 is a bottle. The bottom surface 110 may be a substantially and sufficiently flat surface, such that a flat bottom surface 194 of the specimen container 190 may be reliably supported at a predetermined location.

The fixture 102, as shown in the embodiment of FIGS. 1 and 2, may include one or more supports 140 that may aid in supporting a substantially vertical surface 196 of the specimen container 190. The apparatus may include one or a plurality of supports 140. For example, a support 140 could be provided on only one side of the flat bottom surface 194 or support(s) 140 may be provided along multiple sides of the flat bottom surface 194. In the illustrated embodiment, multiple supports 140 are provided. The apparatus 100 includes an opening 103 through which the height of the volume of the biological sample in the specimen container is visible, and the opening 103 may be referred to as a "viewing window."

A reference indicator 120 may be disposed at a predetermined height relative to the bottom surface 110 of the fixture 102, such that the reference indicator may be visually compared to a height 192 of a volume of a biological sample in the specimen container 190. Preferably, the reference indicator 120 is correlated to the particular shape of the specimen container 190, such that reference indicator 120 provides an indication of whether the specimen container 190 contains an acceptable or desirable volume of the biological sample. The reference indicator 120 can be, for example, a line, as shown in this embodiment. As a further alternative, the reference indicator 120 may be an arrow or other indicia that identifies a location above the bottom surface 110.

The reference indicator 120 can be configured in accordance with the desired use of the apparatus 100. For example, when it is desirable to determine whether at least a minimally sufficient amount of a biological sample is contained in the specimen container 190, the reference indicator 120 can be located at a position relative to the bottom surface 110 of the fixture 102 that corresponds to height that a minimally sufficient amount of biological sample will have in the target specimen container 190. The reference indicator 120 can be located at other positions if it is desirable to make other or different determinations regarding the amount of biological sample contained in the specimen container 190. For example, the reference indicator can be located at a position corresponding to the maximum desired amount of a biological sample in specimen container 190. As a further example, the reference indicator can be located at a position corresponding to an exact amount of a biological sample in specimen container 190, when it is desirable to determine whether the specimen container 190 has such an exact amount.

Depending on the desired use of the apparatus 100, the reference indicator 120 may include additional information that corresponds to its intended use. For example, the additional information may indicate the volume of biological sample corresponding to the reference indicator 120 (shown in FIG. 1), whether the reference indicator 120 corresponds to a minimum, maximum, or exact amount of biological sample (a minimum is shown in FIG. 1), and the intended target specimen container (not shown in FIG. 1). Additionally, the reference indicator 120 can include other indicia, such as the arrow point shown in FIG. 1, to highlight the location of the line and/or to indicate whether the amount of biological sample should be above, below, or equal to the line of the reference indicator 120.

The reference indicator 120 may be permanently affixed to the fixture 102. For example, the reference indicator 120 may be located on one or more of the supports 140. As shown in FIG. 1, the reference indicator 120 can be, for example, printed in ink on the support 140. Alternatively, the reference indicator 120 could be formed as a notch, groove, or other physical differentiator on the support 140. It is understood that the reference indicator 120 could be located on a portion of the fixture 102 other than a support 140.

The description above has focused on a single stall or bay of the apparatus 100. However, the apparatus 100 may have multiple stalls such that the apparatus 100 can accommodate more than one specimen container 190 for evaluation at a single time. Each stall may, or may not, have associated support(s) 140. Additionally, the apparatus 100 may be configured such that only a single reference indicator 120 is provided for all of the stalls, as shown in FIGS. 1 and 2. Alternatively, a reference indicator 120 can be provided for each of the stalls (not shown in FIGS. 1 and 2). Moreover, while it is preferred that the apparatus have the bottom surfaces 110 of the respective stalls collectively disposed in substantially the same plane, it is contemplated that the bottom surfaces 110 of the respective stalls may not be disposed in the same plane, i.e., they may be disposed at different heights relative to one another, to accommodate different specimen containers 190 or different desired measurements, for example.

Figure 3:
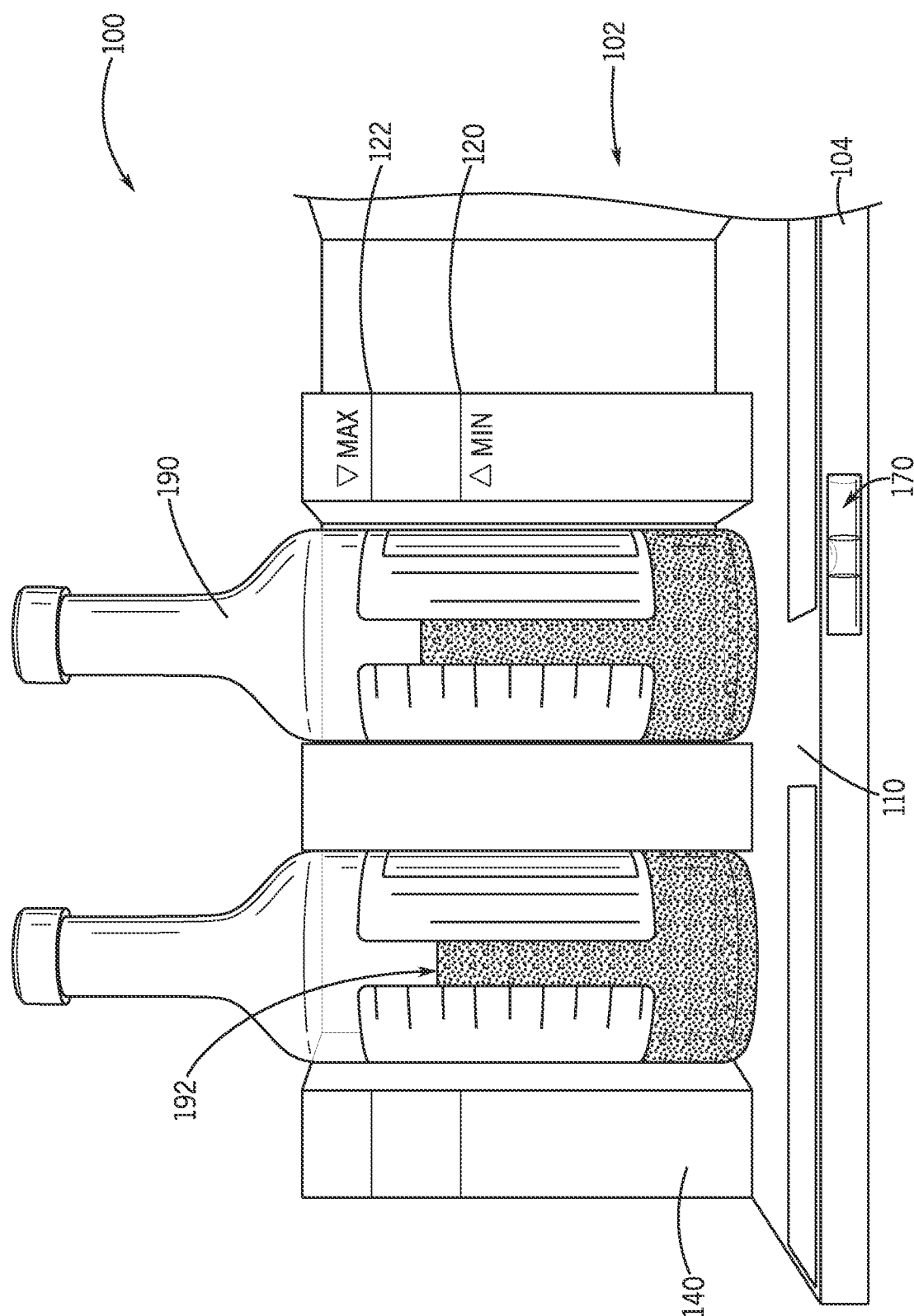
FIG. 3 is a front view of another embodiment of an apparatus for evaluating an amount of biological sample in a specimen container.

An alternative embodiment shown in FIG. 3 illustrates other possible features of an apparatus 100 according to the present invention. In this embodiment, the apparatus 100 includes a reference indicator 120 and a secondary reference indicator 122. As shown in FIG. 3, the reference indicator 120 may be associated with a minimum acceptable biological sample amount, and the secondary reference indicator 122 may be associated with a maximum acceptable biological sample amount.

The embodiment of the apparatus 100 shown in FIG. 3 also includes a feature intended to increase the precision of the evaluation. In particular, since a biological sample is typically a liquid, the precision of the evaluation of the volume of liquid can be adversely impacted if the specimen container 190 is not in a fully upright position. For example, if the specimen container 190 is effectively tilted, the height of the biological sample in the specimen container will be offset. Accordingly, the apparatus 100 may additionally include levelling device 170, preferably disposed in the base 104 of the fixture 102, which is configured to indicate an orientation of the bottom surface 110. Using the leveling device 170, the orientation of the bottom surface 110 can be properly established to ensure that the specimen container is in essentially a fully upright position. Preferably, the leveling device 170 is a spirit level, also known as a line level.

Figure 4:
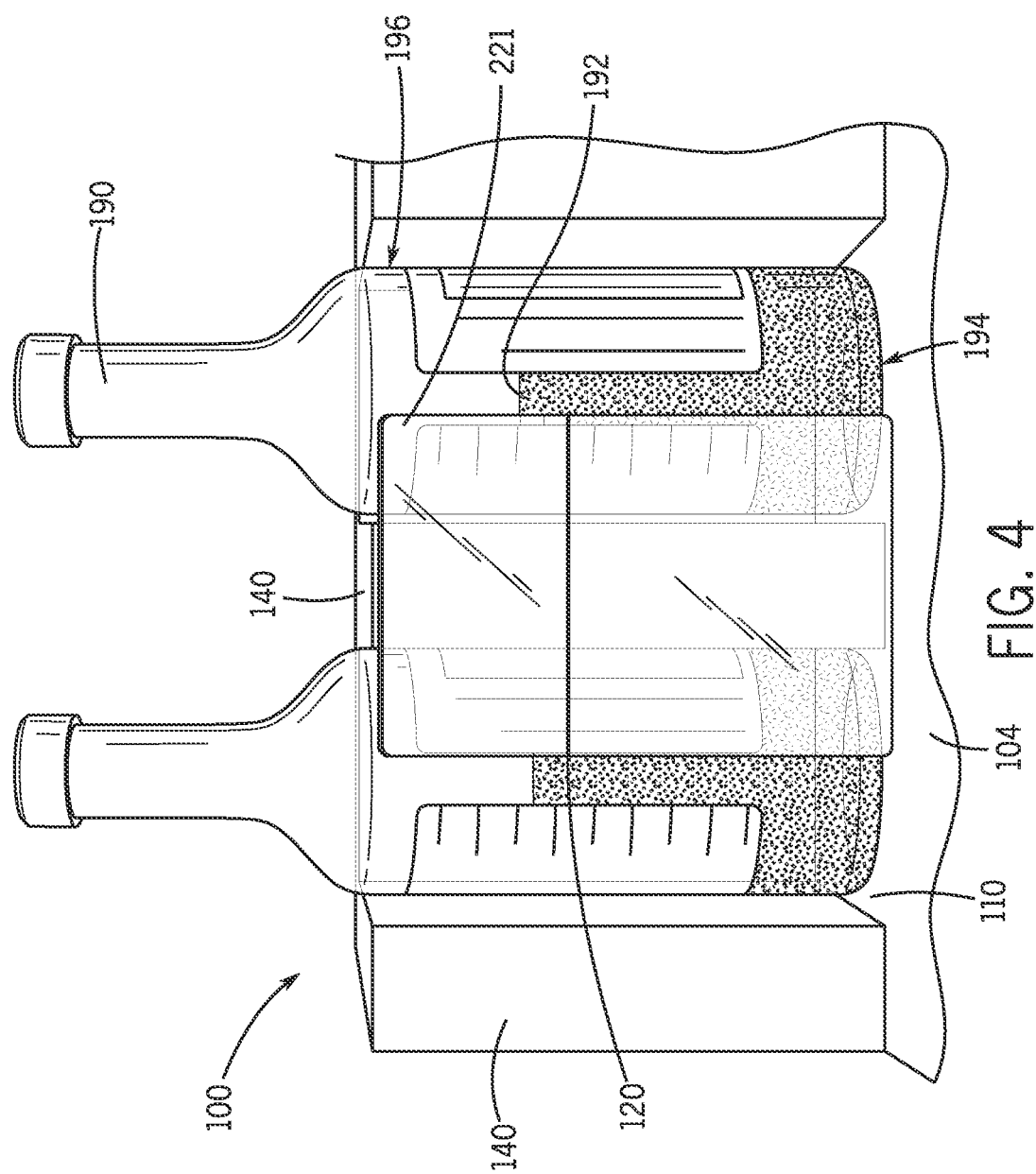
FIG. 4 is a front view of another embodiment of an apparatus for evaluating an amount of biological sample in a specimen container, which includes a removable member.

The embodiment of the apparatus 100 shown in FIG. 4 is an alternative approach for locating the reference indicator 120 at a position relative to the bottom surface 110 of the fixture 102. In this embodiment, the reference indicator 120 may be provided on a member 221, such as a sheet or card, which is preferably transparent. In this embodiment, the member 221 can be sized such that the reference indicator 120 extends and overlays the specimen container 190 to facilitate visual comparison of the reference indicator 120 and the height 192 of a volume of a biological sample in the specimen container 190. The proper location of the reference indicator 120 relative to the bottom surface 110 can be established by placing the bottom of the member 221 against the bottom surface 110.

The member 221 can be affixed to the fixture 102, either removably or permanently. For example, the member 221 can be affixed to the support 140 by an adhesive that allows the member 221 to be removed from and subsequently reattached to the support 140. This approach also allows the member 221 to be attached to different ones of the supports 140. Additionally, this approach allows different members 221, having reference indicators 120 located at different heights, to be affixed to the fixture 102. Consequently, the apparatus 100 can be used with different types of specimen containers 190 by attaching only a member 221 appropriate for the type of specimen container 190 being tested at a given time. Each member 221 may include indicia indicating the type of specimen container 190 to which the member 221 pertains or a type of test for which the indicated amount of biological sample is acceptable.

Figure 5B:
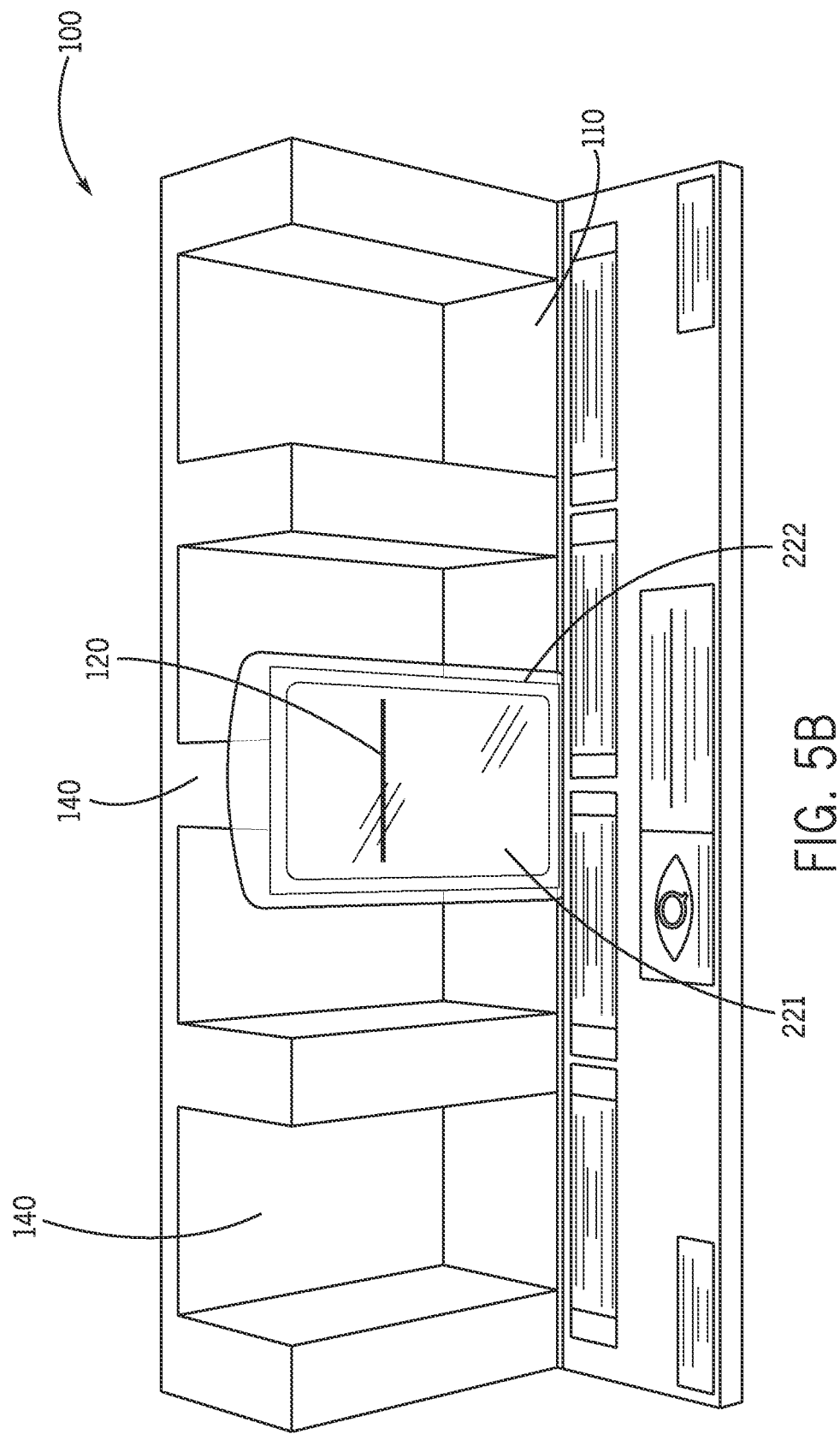
Figure 5C:
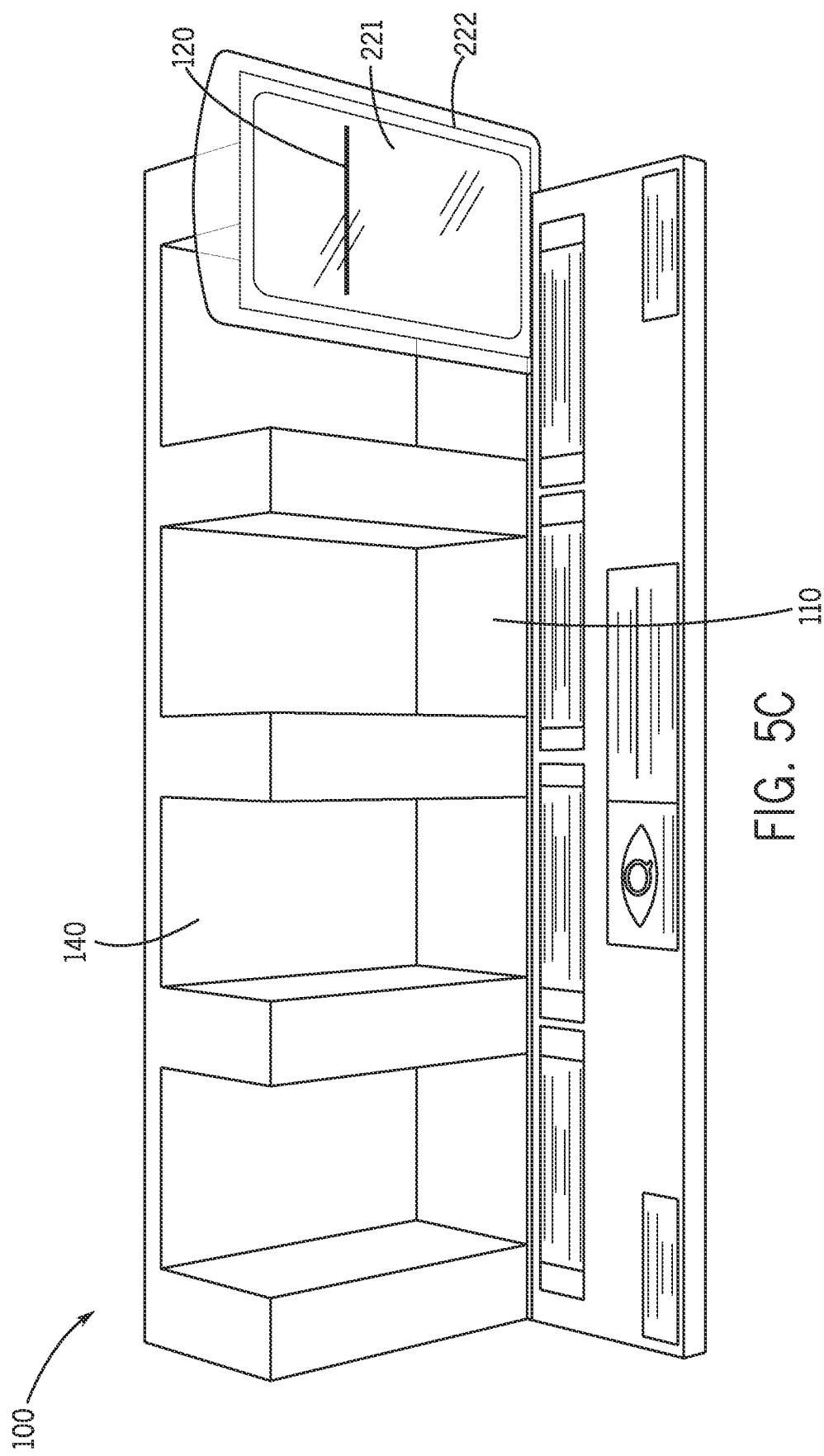

The embodiment shown in FIGS. 5A, 5B, and 5C is yet another alternative approach for locating the reference indicator 120 at a position relative to the bottom surface 110 of the fixture 102. In this embodiment, a holder 222 is provided on the fixture 102. The holder 222 can be, for example, a slot and/or a sleeve that will receive the member 221. The holder 222 is preferably transparent so that the reference indicator 120 and the height 192 of a volume of a biological sample in the specimen container 190 will both be visible through the holder 222. The holder 222 should be affixed to the fixture 102 such that reference indicator 120 is properly positioned relative to the bottom surface 110. This can be achieved in a variety of ways, including carefully positioning the holder 222 on the fixture 102 or by placing the bottom of the holder 222 against the bottom surface 110.

The holder 222 can be affixed to the fixture 102, either removably or permanently, to thereby affix the member 221 to the fixture. For example, the holder 222 can be affixed to the support 140 by an adhesive. Preferably, the adhesive allows the holder 222 to be removed from and subsequently reattached to the support 140. This approach would allow the holder 222 to be attached to different ones of the supports 140.

The use of the holder 222 allows different members 221, having reference indicators 120 located at different heights, to be inserted into the holder 222 and affixed to the fixture 102. Consequently, the apparatus 100 can be used with different types of specimen containers 190 by inserting into the holder 222 only a member 221 appropriate for the type of specimen container 190 being tested at a given time. As noted above, each member 221 may include indicia indicating the type of specimen container 190 to which the member 221 pertains or a type of test for which the indicated amount of biological sample is acceptable.

Figure 6:
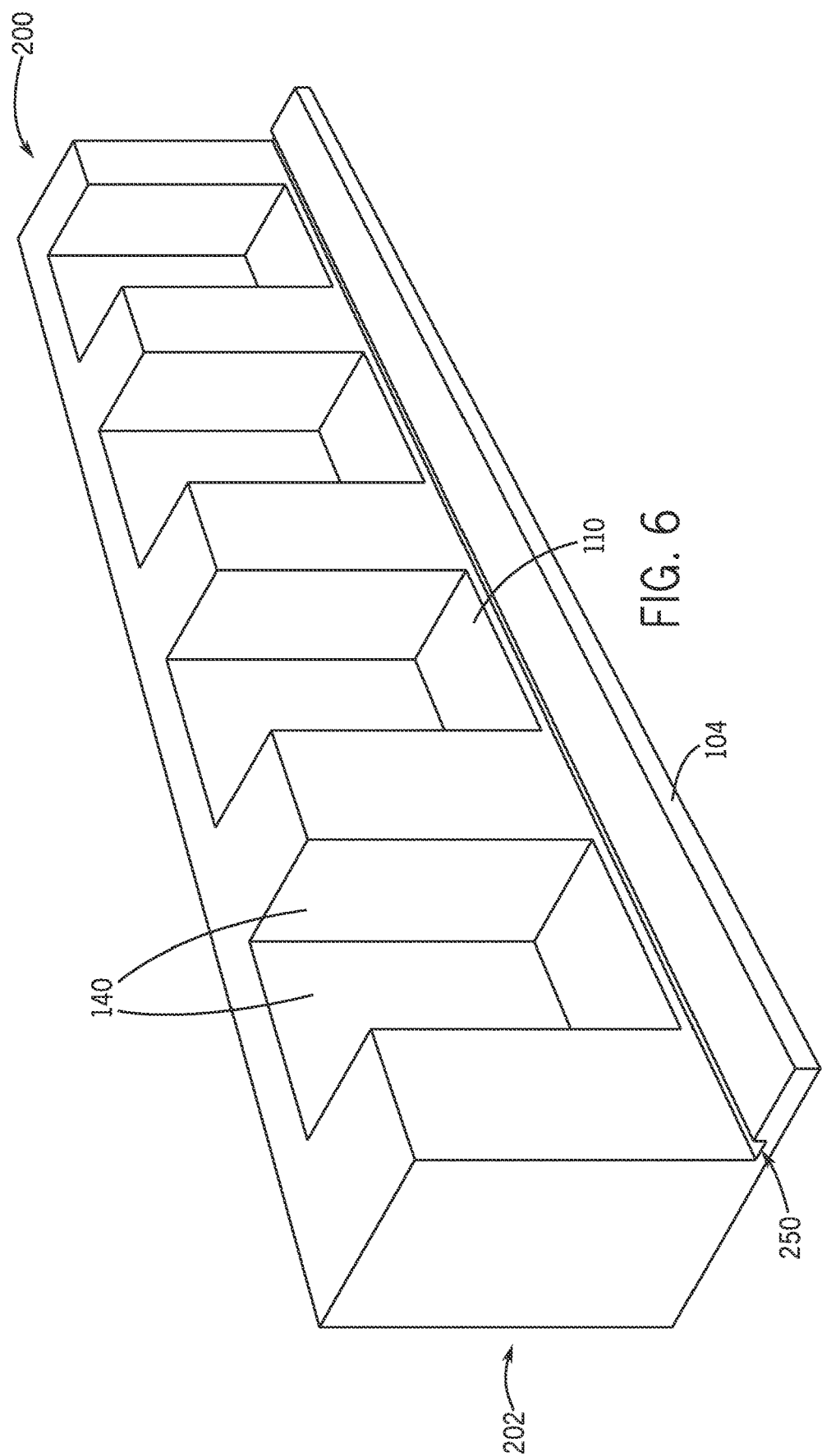
FIG. 6 is a perspective view of another embodiment of an apparatus for evaluating an amount of biological sample in a specimen container, which is configured to accept a removable member.
Figure 7:
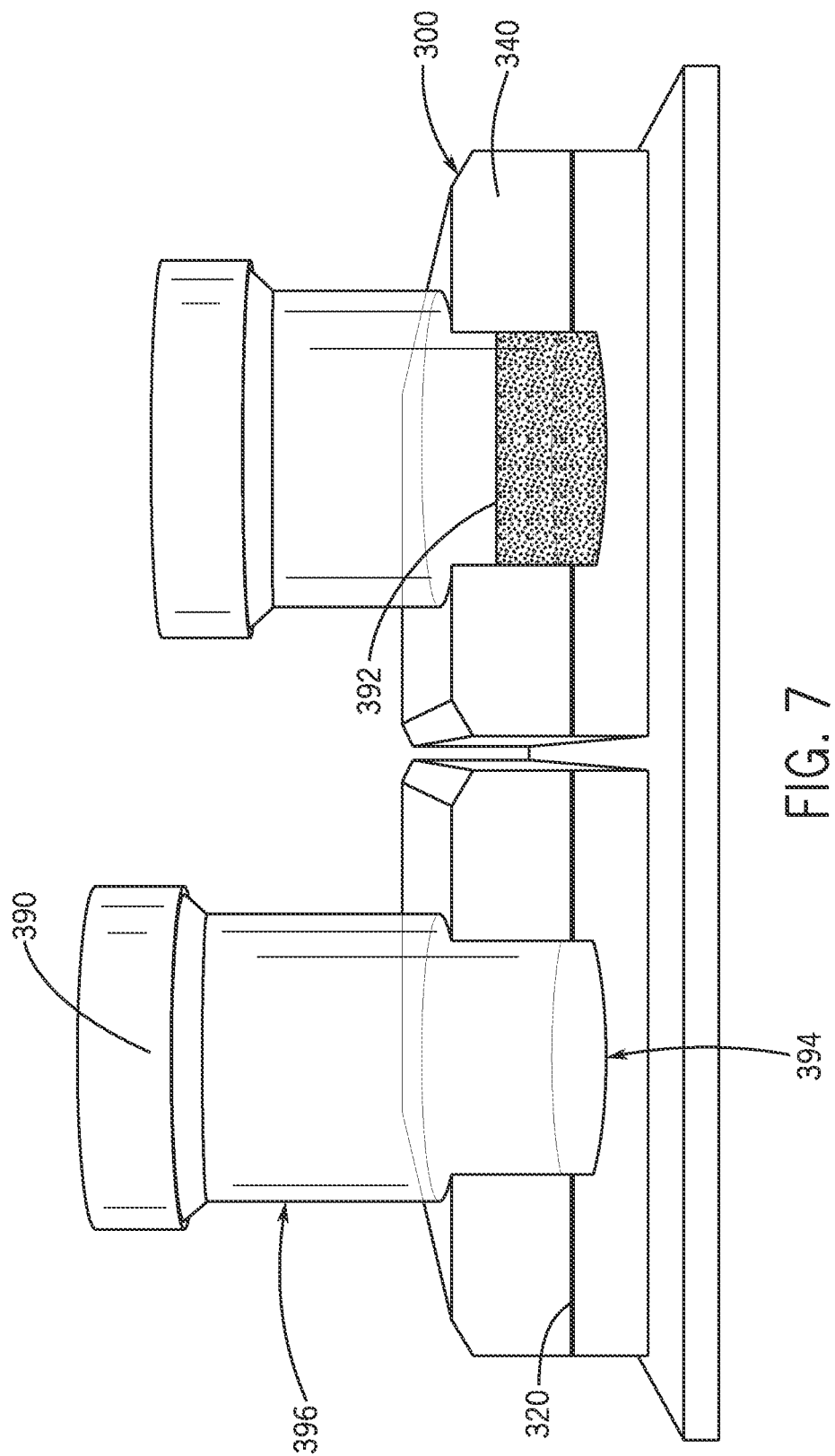
FIG. 7 is a front view of another embodiment of an apparatus for evaluating an amount of biological sample in a specimen container.
Figure 8:
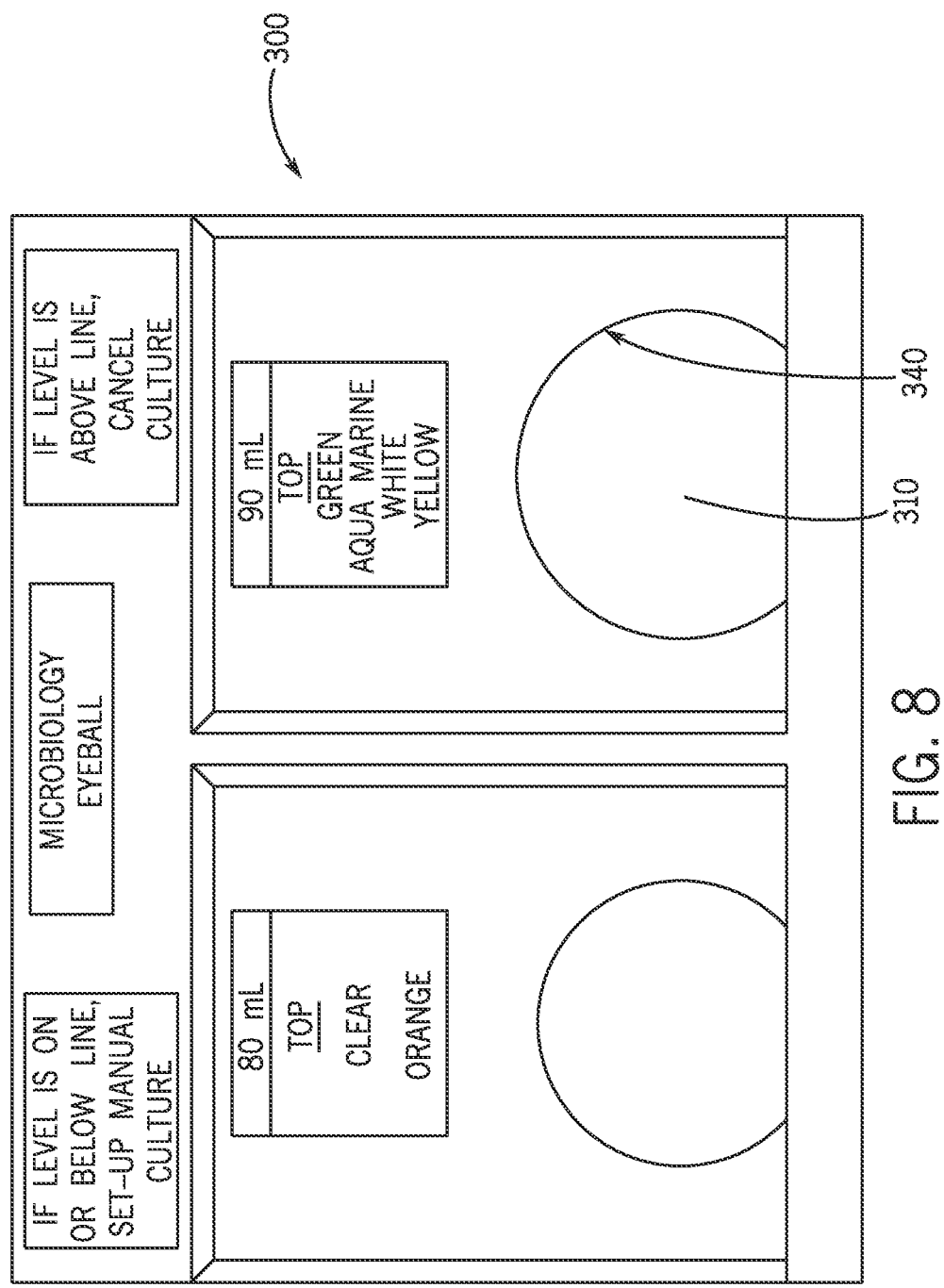
FIG. 8 is a top view of the apparatus of FIG. 7.
Figure 9:
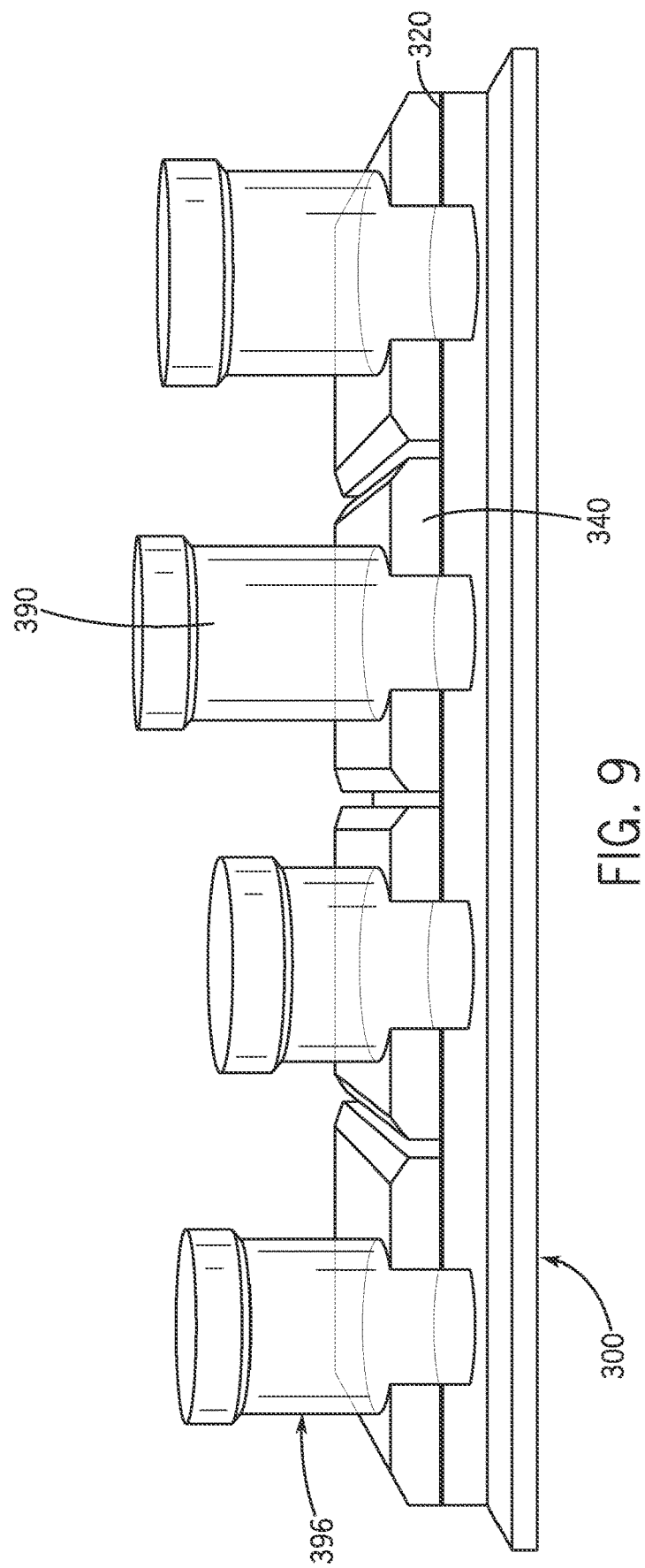
FIG. 9 is a perspective view of another embodiment of an apparatus for evaluating an amount of biological sample in a specimen container.

An alternative embodiment of the apparatus 200 is shown in FIG. 6, which allows the member 221 and/or the holder 222 to be affixed to the fixture 202 in a different manner than described above. In this embodiment, a groove or slot 250 is created in the base 104 of the fixture 102. The member 221 and/or the holder 222 can be disposed in the groove 250 to affix the member 221 and/or holder 222 to the fixture 202 and to thereby locate the reference indicator 120 at a position relative to the bottom surface 110 of the fixture 202.

Figure 10:
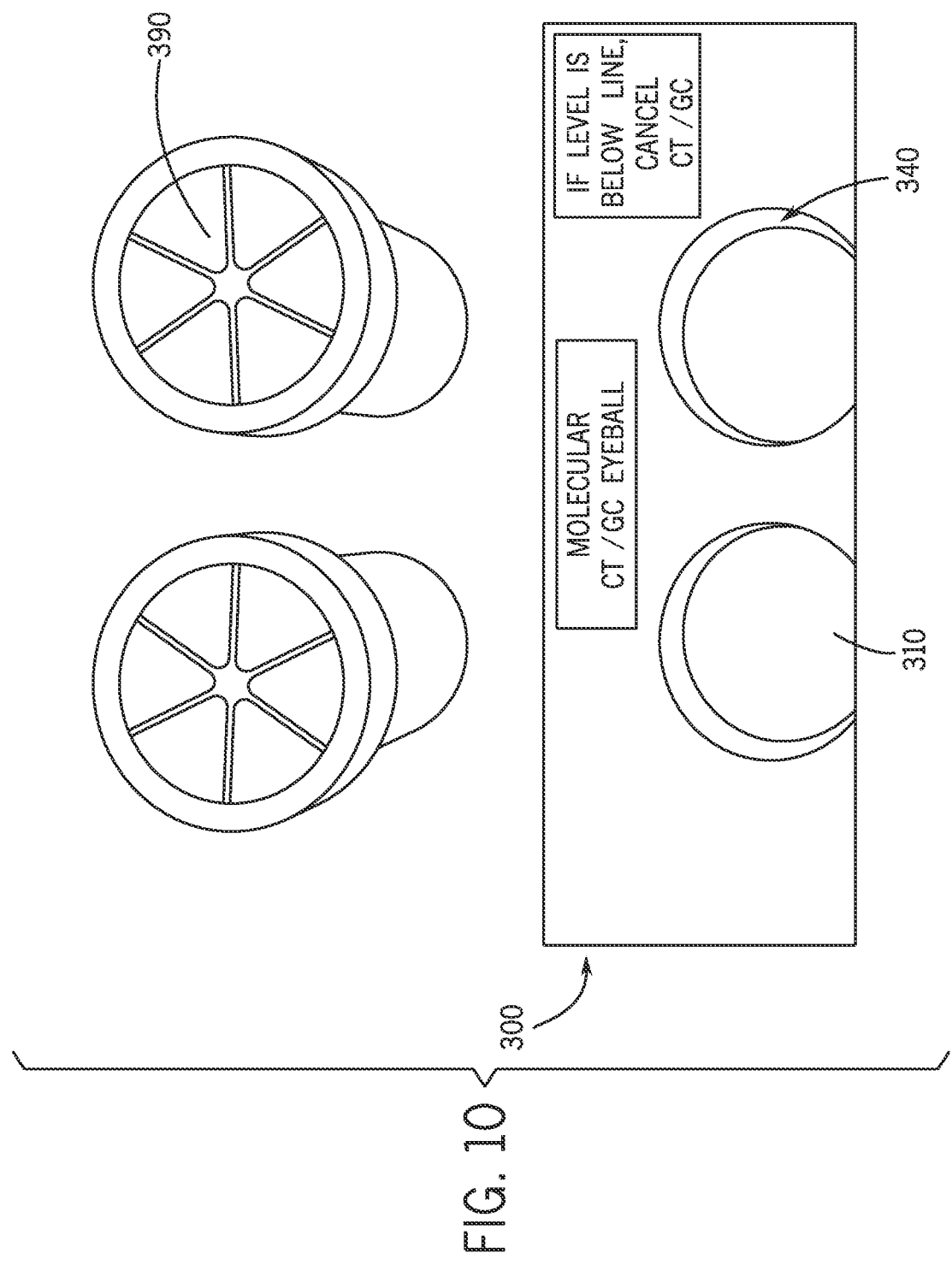
FIG. 10 is a top view of another embodiment of an apparatus for evaluating an amount of biological sample in a specimen container.

As shown in the embodiment of FIGS. 7-10, the apparatus 300 may include a support 340 with a shape that matches at least a portion of the contour of the vertical surface 396 of the specimen container 390. In this embodiment, the apparatus 300 includes a bottom surface 310 configured to support a specimen container 390. The specimen container 390 shown in FIGS. 7-10 is a cup. A reference indicator 320 may be disposed at a predetermined height relative to the bottom surface 310, such that the reference indicator may be visually compared to a height 392 of a volume of a biological sample in the specimen container 390. The bottom surface 310 may be a flat surface such that a flat bottom surface 394 of the specimen container 390 may be supported. The support 340 can support a substantially vertical surface 396 of the specimen container 390. The support 340 preferably has a shape that matches at least a portion of the contour of the vertical surface 396 of the specimen container 390. In the configuration shown in FIGS. 7-9, the supports 340 of the different stalls of the apparatus are separated, however, they could be formed as a continuous member, as shown in FIG. 10.

Figure 11:
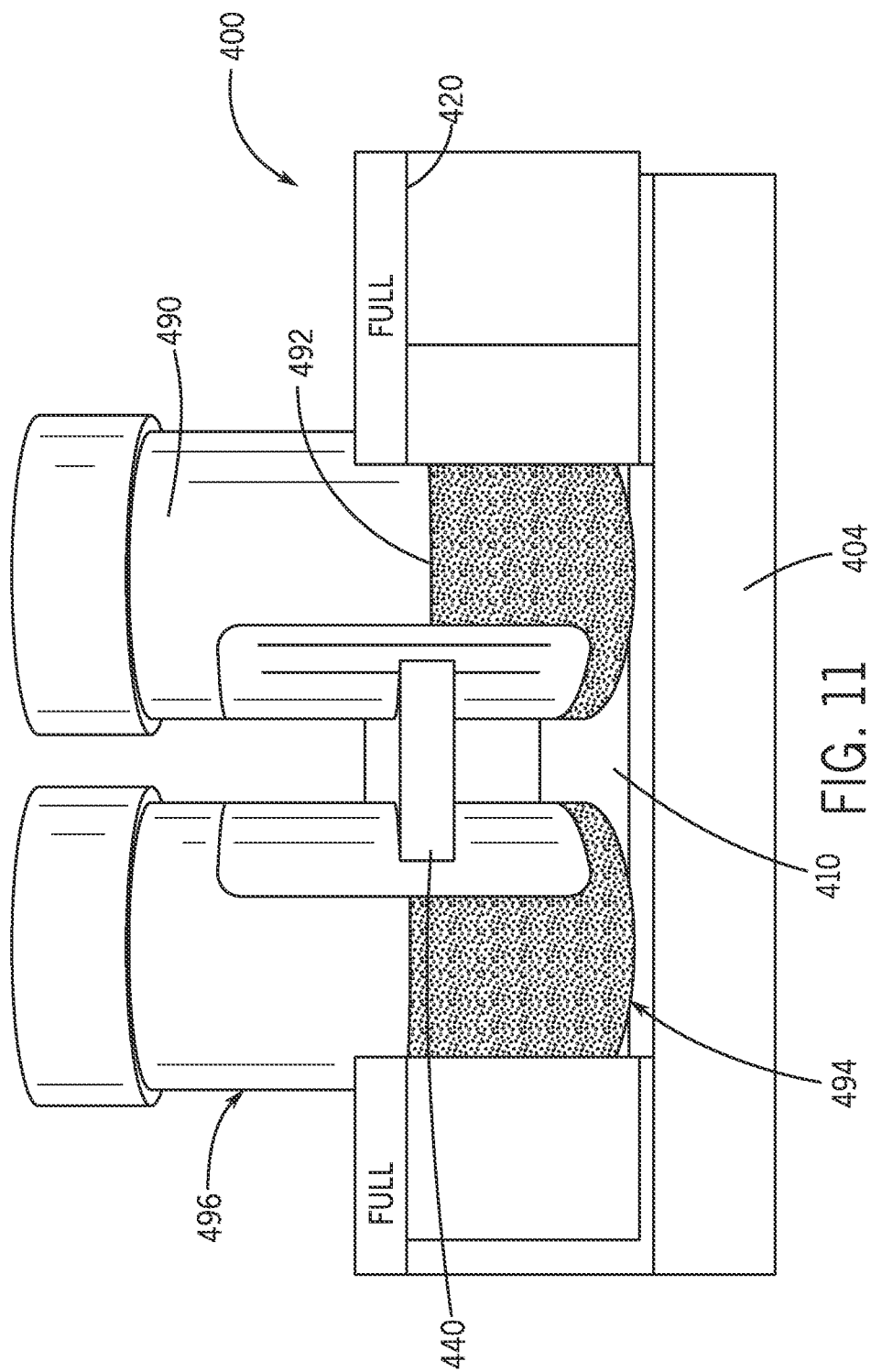
FIG. 11 is a front view of another embodiment of an apparatus for evaluating an amount of biological sample in a specimen container.
Figure 12:
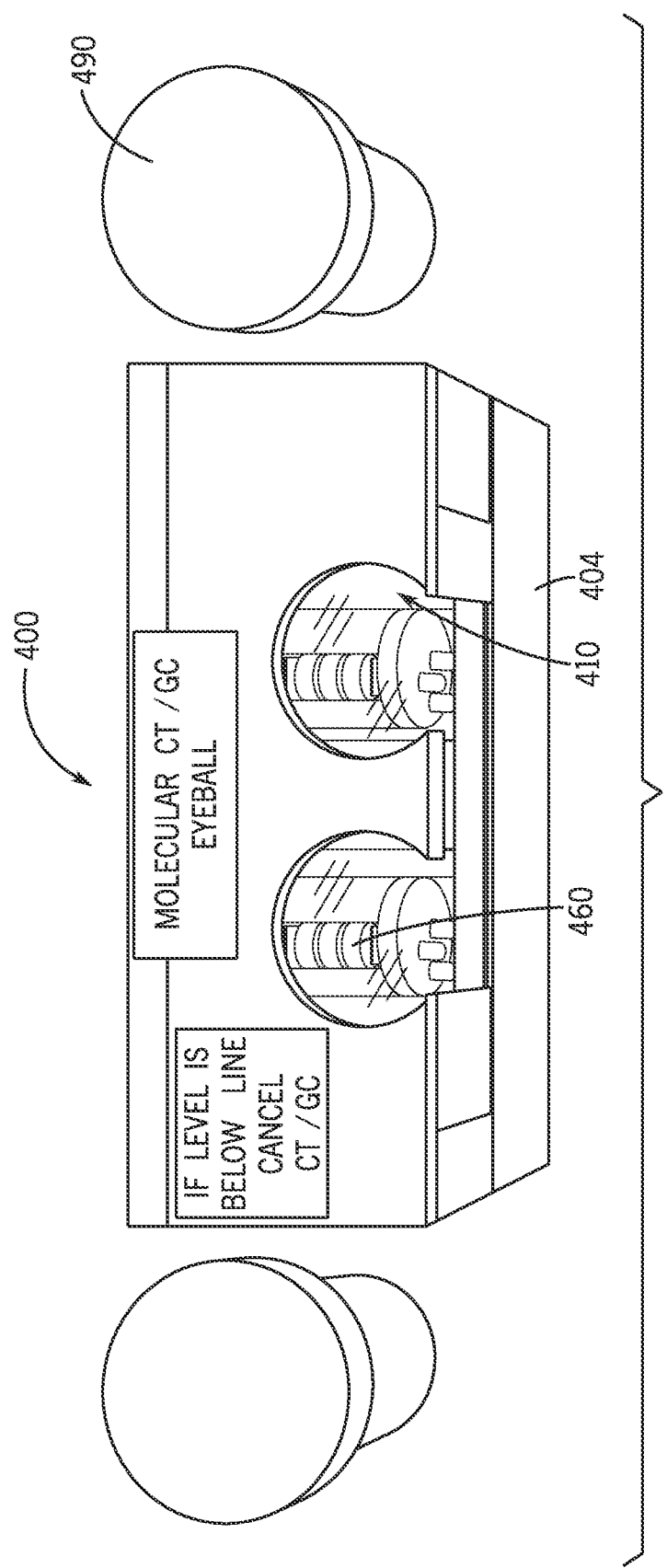
FIG. 12 is a top view of the apparatus of FIG. 11.

As shown in the embodiment of FIGS. 11 and 12, the apparatus 400 may include a light source 460 configured to illuminate the specimen container 490 to facilitate the visual comparison of the reference indicator 420 with the height 492 of the volume of biological sample in the specimen container 490. In this embodiment, the base 402 has a bottom surface 410 configured to support the specimen container 490. The specimen container 490 shown in FIGS. 11 and 12 is a vial. The reference indicator 420 may be disposed at a predetermined height relative to the bottom surface 410. The apparatus can include a support 440, which may support a substantially vertical surface 496 of the specimen container 490.

The light source 460 is configured to illuminate the biological sample in the specimen container 490. The illumination of the biological sample may make easier the visual comparison of the height 492 of the biological sample in the specimen container 490 with the reference indicator 420. The light source 460 preferably is located within the base 402. The light source 460 can be positioned below the bottom surface 410 of the fixture. The bottom surface 410 is preferably sufficiently transparent to allow the transmission of light to the specimen container 490. The light source 460 can be a conventional source of light suitable for the intended use, and it can be controlled by conventional circuitry. The light source 460 may be battery powered.

Figure 17:
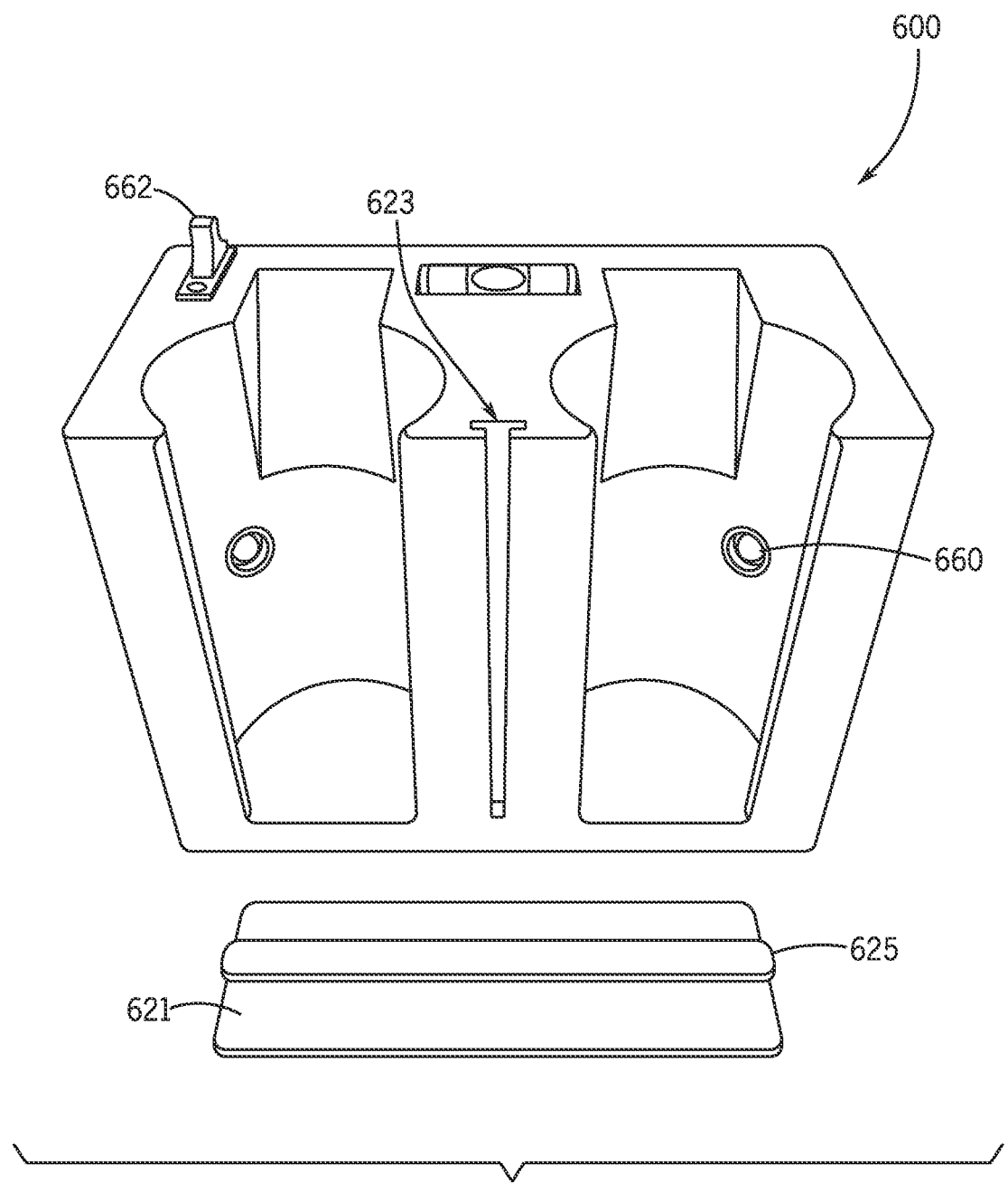
FIG. 17 is a perspective view of the apparatus of FIG. 16 in a disassembled state.
Figure 18:
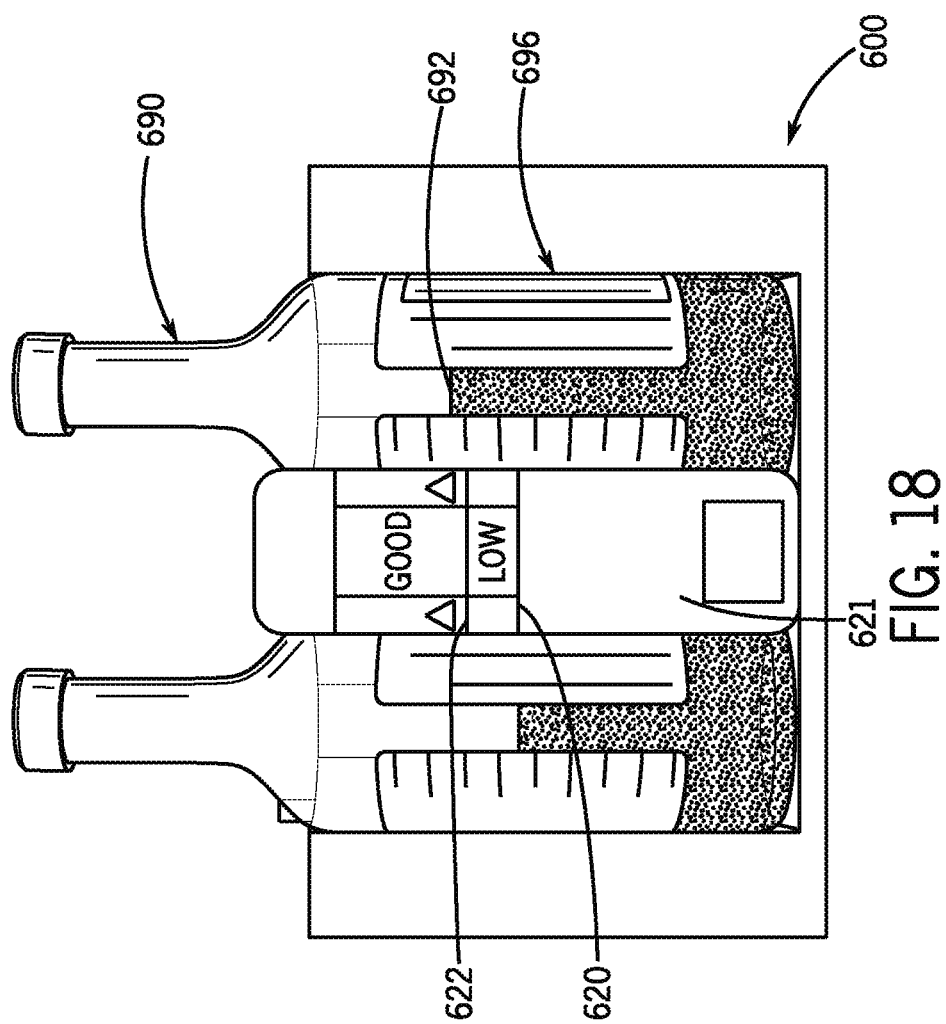
FIG. 18 is a front view of the apparatus of FIG. 16.

As shown in the embodiment of FIGS. 13-18, the apparatus 600 may include a light source 660 configured to illuminate the specimen container 690 to facilitate the visual comparison of the reference indicator 620 and the secondary reference indicator 622 with the height 692 of the volume of biological sample in the specimen container 690. In this embodiment, the base 602 has a bottom surface 610 configured to support the specimen container 690. The specimen containers 690 shown in FIG. 18 are bottles. The reference indicator 620 and the secondary reference indicator 622 may be disposed at predetermined heights relative to the bottom surface 610. The apparatus can include a support 640, which may support a substantially vertical surface 696 of the specimen container 690.

The light source 660 is configured to illuminate the biological sample in the specimen container 690. The illumination of the biological sample may make easier the visual comparison of the height 692 of the biological sample in the specimen container 690 with the reference indicator 620. The light source 660 preferably is located within the support 640, adjacent a substantially vertical surface 696 of the specimen container. The light source 660 can be a conventional source of light suitable for the intended use, and it can be controlled by conventional circuitry. The light source 660 may be a light emitting diode, such as a battery powered light emitting diode. The light source 660 may be controlled by a switch 662.

A leveling device 670 is provided on the apparatus 600 such that the orientation of the bottom surface 610 can be properly established to ensure that the specimen container 690 is in essentially a fully upright position. Preferably, the leveling device 670 is a spirit level, also known as a line level.

Figure 13:
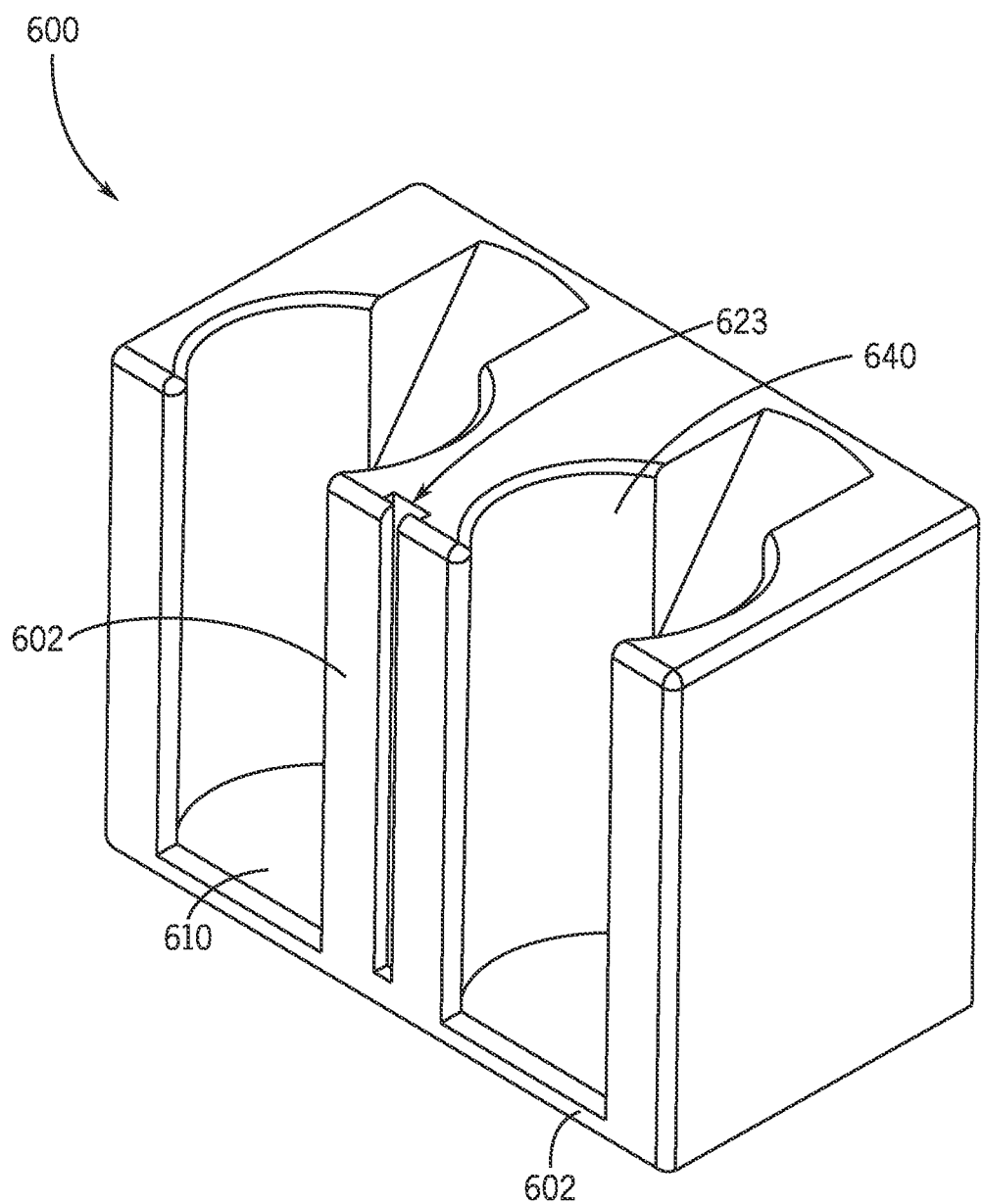
FIG. 13 is a perspective view of another embodiment of an apparatus for evaluating an amount of biological sample in a specimen container.
Figure 14:
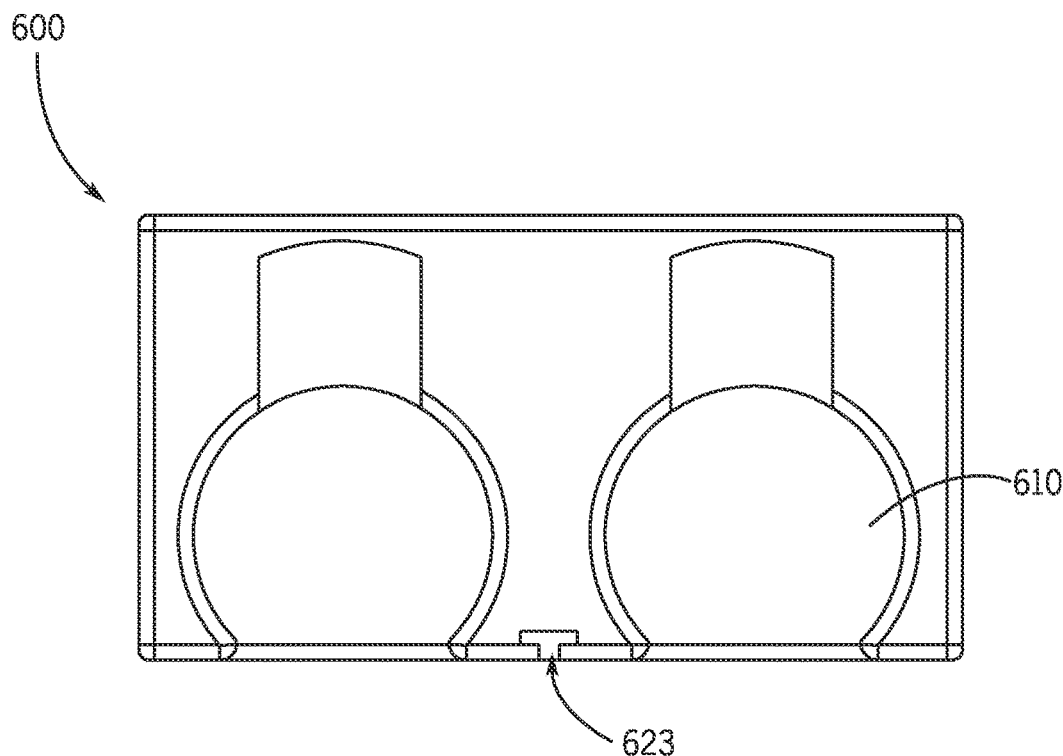
FIG. 14 is a top view of the apparatus of FIG. 13.
Figure 15:
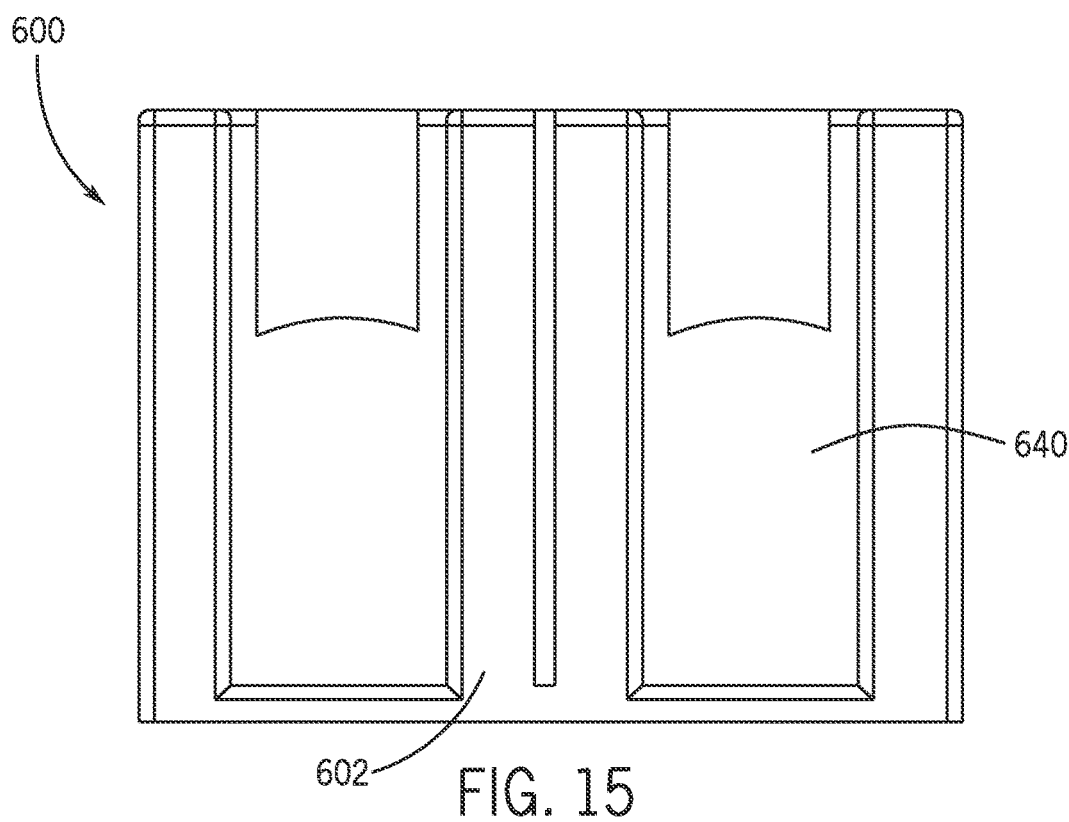
FIG. 15 is a front view of the apparatus of FIG. 13.
Figure 16:
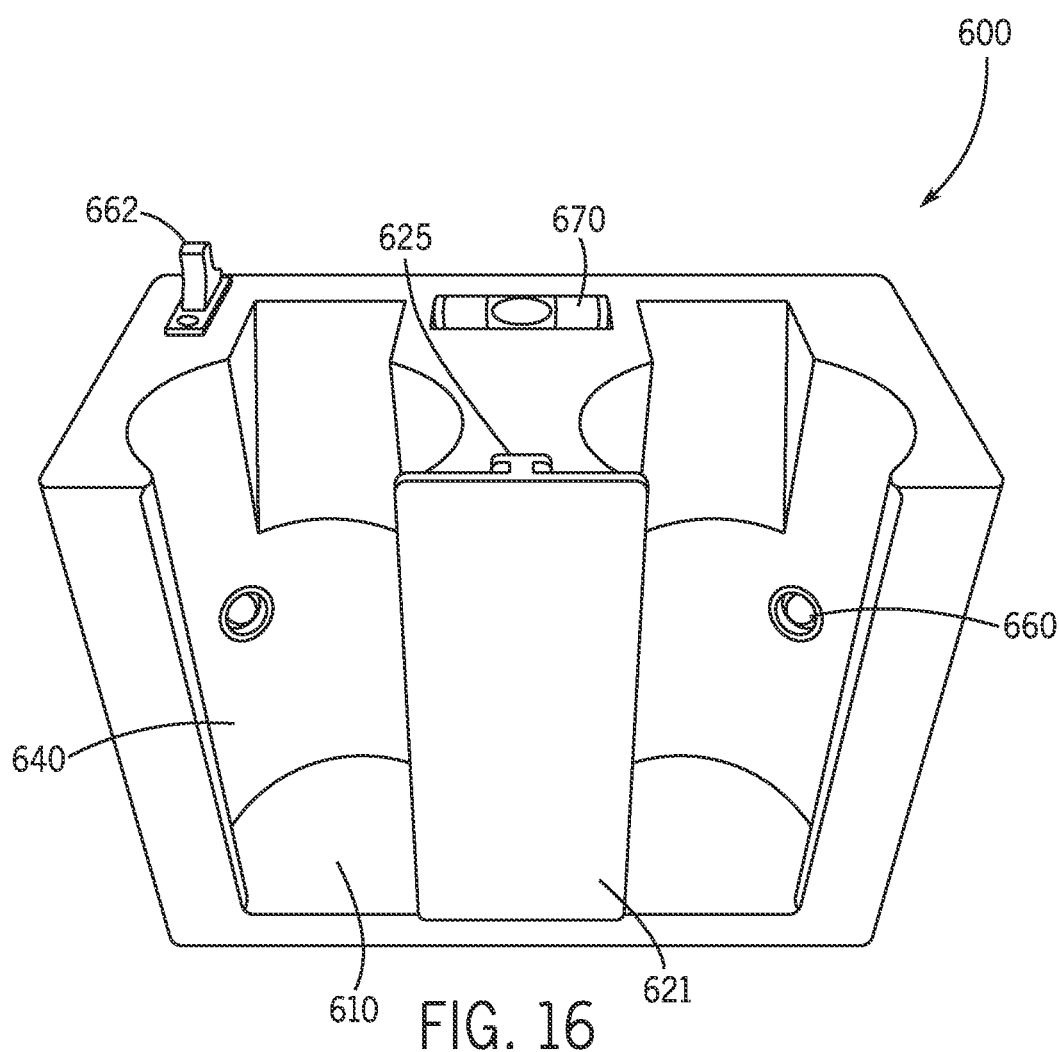
FIG. 16 is a perspective view of the apparatus of FIG. 13 with a removable member installed.

The reference indicator 620 and the secondary reference indicator 622 may be provided on a member 621 that engages a holder 623 provided on a fixture 602 of the apparatus 600. The holder 623 can be, for example, a slot and/or a sleeve that will receive a corresponding portion of the member 621. The holder 623 is provided on the fixture 602 such that reference indicator 620 and secondary reference indicator 622 are properly positioned relative to the bottom surface 610. As shown in FIGS. 13, 14 and 17, the holder 623 may be in the form of a T-shaped groove that accepts a corresponding T-shaped protruding portion 625 of the member 621. The engagement of the protruding portion 625 with the holder 623 securely affixes the member 621 to the fixture 602.

The use of the holder 623 allows different members 621, having reference indicators 620 and 622 located at different heights, to be inserted into the holder 623 and affixed to the fixture 602. Consequently, the apparatus 600 can be used with different types of specimen containers 690 by inserting into the holder 623 only a member 621 appropriate for the type of specimen container 690 being tested at a given time. Each member 621 may include indicia indicating the type of specimen container 690 to which the member 621 pertains or a type of test for which the indicated amount of biological sample is acceptable.

As shown in FIG. 18, the area above the secondary reference indicator 622 indicates a suitable biological sample volume for a first condition, such as a first test, and the area between the reference indicator 620 and the secondary reference indicator 622 indicates a suitable biological sample volume for a second condition, such as a second test. For example, the area above the secondary reference indicator 622 may indicate a biological sample volume suitable for a first test for a given condition, while the area between the reference indicator 620 and the secondary reference indicator 622 indicates a biological sample volume suitable for a second test for the given condition that requires less biological sample volume than the first test.

Figure 19:
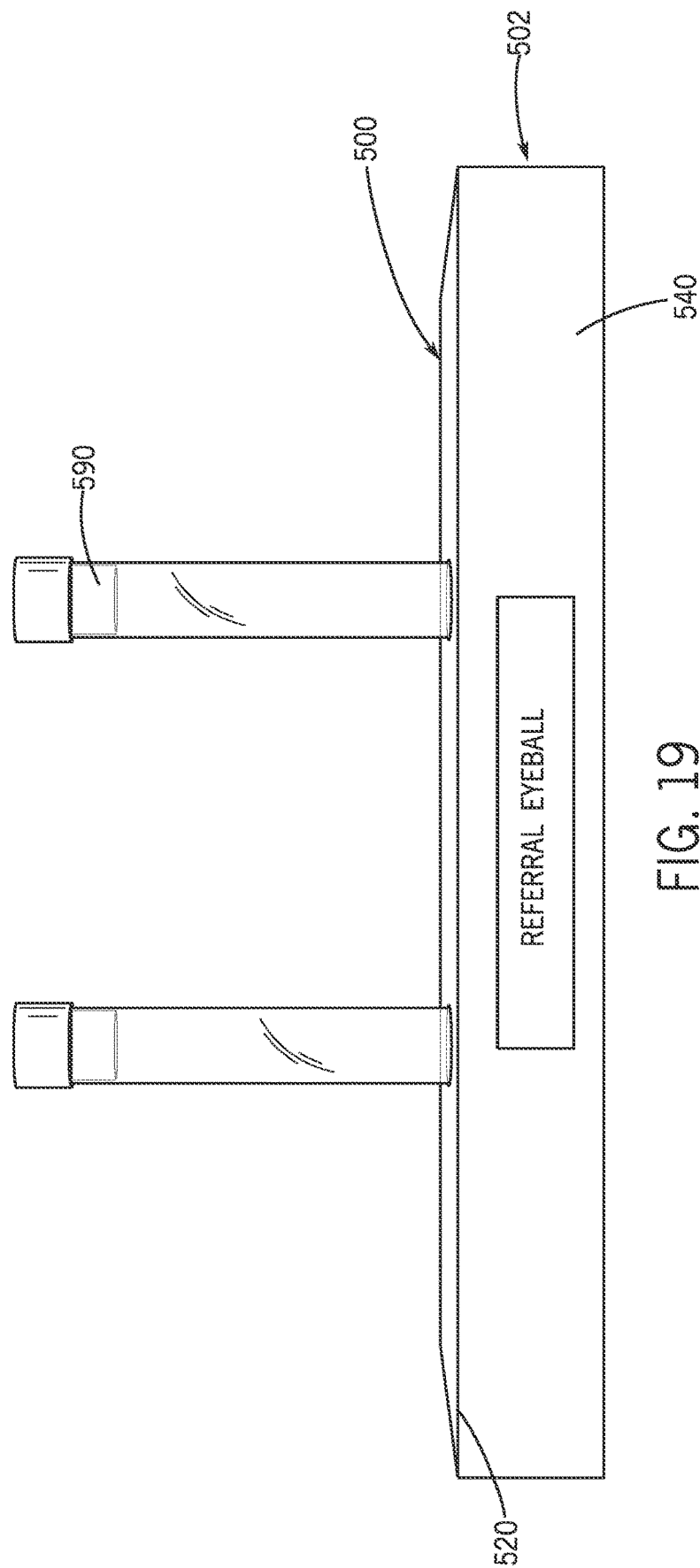
FIG. 19 is a front view of another embodiment of an apparatus for evaluating an amount of biological sample in a specimen container.
Figure 20:
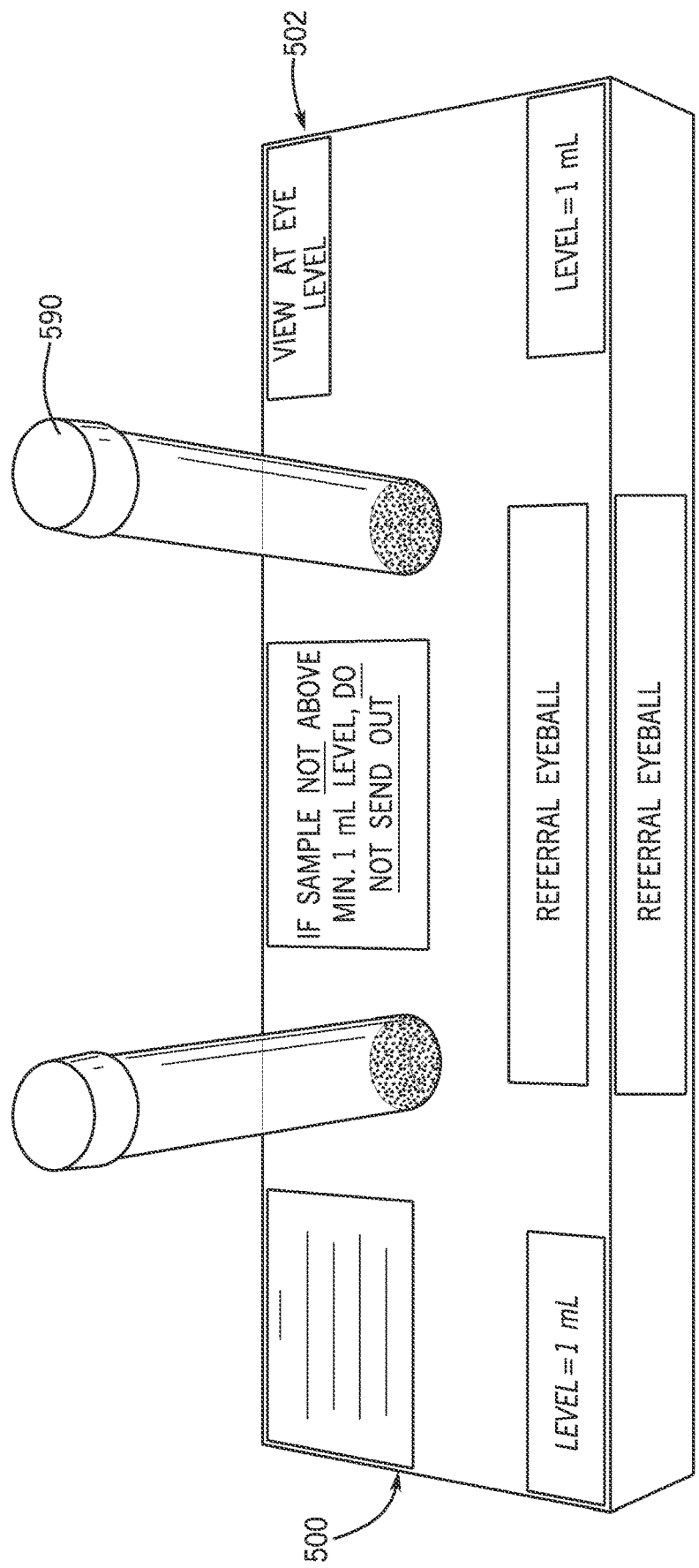
FIG. 20 is a perspective view of the apparatus of FIG. 19.
Figure 21:
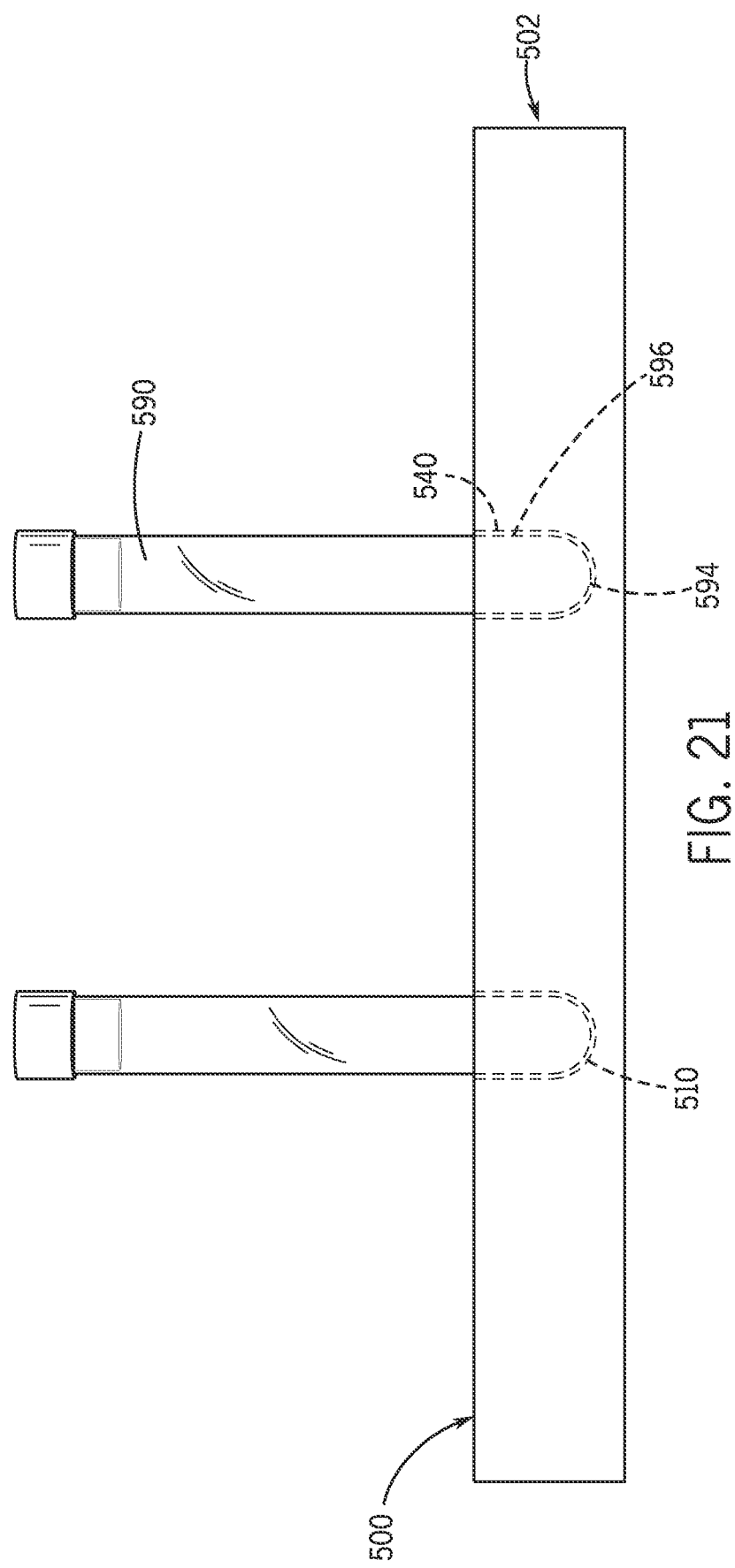
FIG. 21 is a schematic depiction of the apparatus of FIG. 19.

As shown in the embodiment of FIGS. 19-21, the apparatus 500 may include a bottom surface 510 contoured to match the specimen container 590 and may have a reference indicator 520 formed by a top or upper surface of fixture 502. The particular specimen container 590 shown in FIGS. 19-21 is a test tube. The bottom surface 510 may be a curved surface such that a curved bottom surface 594 of the specimen container 590 may be supported. The apparatus 500 may additionally include a support 540 that may support a substantially vertical surface 596 of the specimen container 590. The support 540 may have a shape that matches at least a portion of the contour of the vertical surface 596 of the specimen container 590.

The reference indicator 520 may be formed by the upper surface of the apparatus 500. As before, the reference indicator 520 may be disposed at a predetermined height relative to the bottom surface 510, such that the reference indicator may be visually compared to a height 592 of a volume of a biological sample in the specimen container 590.

The apparatuses described above, and appropriate variations and permutations of them, can be used to efficiently and accurately evaluate an amount of biological sample in a specimen container. The specimen container merely needs to be disposed in the fixture on the bottom surface thereof. The height of the volume of the biological sample can then be compared to the reference indicator, which is disposed at a predetermined height relative to the bottom surface. Consequently, a quick and accurate determination can be made regarding whether the specimen container has an appropriate amount of biological sample. Preferably, the reference indicator and an eye level of a user can be relatively positioned such that the reference indicator and the eye level of the user are located at substantially the same height. Such relative positioning can be achieved through vertical positioning of the reference indicator and/or the eye level of the user. The location of the reference indicator at an eye level of a user improves the speed and accuracy of the visual comparison of the reference indicator to the height of the volume of the biological sample in the specimen container. A meniscus may be formed by the biological sample in the specimen container. In such cases that a meniscus is formed by the biological sample in the specimen container, the visual comparison of the height of the volume of the biological sample to the reference indicator includes the comparison of the center of the meniscus formed by the biological sample to the reference indicator.

The apparatuses described herein allow the low cost and accurate determination of whether the amount of a biological sample in a specimen container is acceptable for a desired laboratory test. The apparatuses allow the evaluation of the amount of the biological sample with high speed and without opening the specimen container or removing the biological sample from the specimen container. Additionally, the amount of the biological sample in the specimen container may be determined qualitatively without quantitatively measuring the volume of the biological sample. The apparatuses described herein may be utilized to determine, for example, whether the amount of biological sample present in a specimen container is suitable for a blood culture test, a chlamydia/gonorrhea test, a chlamydia test, a gonorrhea test, a urine culture test, a coagulation test, a human papilloma virus DNA test, and a human papilloma virus mRNA test.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An apparatus for evaluating an amount of biological sample in a specimen container, comprising:
   a removable member comprising a protruding portion on one face of the removable member and a reference indicator disposed on the removable member on another face of the removable member directly opposite the one face;
   a fixture with a bottom surface configured to support a specimen container, wherein the fixture further comprises a holder for holding receiving the protruding portion of the removable member, the holder having a bottom support portion;
   wherein a lower end of the protruding portion is configured to rest on top of the bottom support portion of the holder such that, when the removable member is held in the holder, the holder positions the removable member in a predetermined position relative to the bottom surface of the fixture and the reference indicator is positioned at a predetermined height relative to the bottom surface,
   wherein the lower end of the protruding portion is an end of the removable member that is closest to the bottom surface,
   wherein the reference indicator is an indicium that identifies a location above the bottom support portion of the holder and provides a volume measurement of a biological sample in the specimen container, wherein the volume measurement is based on a biological sample distance of the specimen container above the bottom surface of the fixture,
   wherein the reference indicator is configured to facilitate a visual comparison of the reference indicator with a height of a volume of the biological sample in the specimen container to provide the volume measurement,
   wherein the holder is at least one of a slot and a sleeve having a shape corresponding to a shape of the protruding portion of the removable member.

2. The apparatus of claim 1, wherein the bottom surface comprises a flat surface configured to support a specimen container with a flat bottom.

3. The apparatus of claim 1, wherein the bottom surface comprises a curved surface configured to support a specimen container with a curved bottom.

4. The apparatus of claim 1, wherein the fixture includes a support, wherein the support is configured to support a substantially vertical surface of the specimen container.

5. The apparatus of claim 1, wherein the fixture includes a spirit level configured to indicate an orientation of the bottom surface.

6. The apparatus of claim 1, wherein the removable member comprises an indicator to identify a type of specimen container to be used with the removable member.

7. The apparatus of claim 1, wherein the reference indicator is at least one of a reference line, an arrow, and a top surface of the fixture.

8. The apparatus of claim 1, further comprising a light source configured to illuminate the specimen container to facilitate the visual comparison of the reference indicator with the height of the volume of biological sample in the specimen container.

9. The apparatus of claim 1, wherein the bottom surface is transparent.

10. The apparatus of claim 1, further comprising a second reference indicator located at a second predetermined height relative to the bottom surface.

11. The apparatus of claim 10, wherein the area above the reference indicator indicates a volume of biological sample suitable for a first condition, and the area between the reference indicator and the second reference indicator indicates a volume of biological sample suitable for a second condition.

12. A method of evaluating an amount of biological sample in a specimen container, the method comprising:
   disposing the specimen container in a fixture having a bottom surface configured to support the specimen container, wherein the fixture further comprises a holder for receiving a removable member having a protruding portion on one face of the removable member and a reference indicator disposed on the removable member on another face of the removable member directly opposite the one face;
   disposing the protruding portion of the removable member in the holder such that a lower end of the protruding portion rests on top of a bottom support portion of the holder, the holder positions the removable member in a predetermined position relative to the bottom surface of the fixture, and the reference indicator is positioned at a predetermined height relative to the bottom surface,
   wherein the holder is at least one of a slot and a sleeve having a shape corresponding to a shape of the protruding portion of the removable member,
   wherein the lower end of the protruding portion is an end of the removable member that is closest to the bottom surface; and
   visually comparing a height of a volume of a biological sample in the specimen container with the reference indicator to provide a volume measurement of biological sample contained within the specimen container,
   the reference indicator comprising an indicium that identifies a location above the bottom support portion of the holder and provides the volume measurement of the biological sample in the specimen container, wherein the volume measurement is based on a biological sample distance of the specimen container above the bottom surface of the fixture.

13. The method of claim 12, further comprising placing a substantially vertical surface of the specimen container in contact with a support of the fixture that is configured to support a substantially vertical surface of the specimen container.

14. The method of claim 12, further comprising leveling the bottom surface.

15. The method of claim 12, further comprising illuminating the specimen container with a light source.

16. The method of claim 12, further comprising relatively positioning the reference indicator and an eye level of a user such that the reference indicator and the eye level of the user are located at substantially the same height, wherein visually comparing the height of the volume of the biological sample in the specimen container with the reference indicator comprises visually comparing a portion of a meniscus formed by the biological sample to the reference indicator.

* * * * *

UNITED STATES PATENT AND TRADEMARK OFFICE
CERTIFICATE OF CORRECTION

PATENT NO. : 11,378,435 B2
APPLICATION NO. : 15/511982
DATED : July 5, 2022
INVENTOR(S) : Christine Amendt et al.

It is certified that error appears in the above-identified patent and that said Letters Patent is hereby corrected as shown below:

In the Claims

Column 10, Claim 1, Line 14, "holder for holding receiving" should be --holder for receiving--.

Signed and Sealed this
Twenty-seventh Day of September, 2022

Katherine Kelly Vidal
*Director of the United States Patent and Trademark Office*